(12) United States Patent
Johnson et al.

(10) Patent No.: US 10,846,779 B2
(45) Date of Patent: Nov. 24, 2020

(54) CUSTOM PRODUCT CATEGORIZATION OF DIGITAL MEDIA CONTENT

(71) Applicant: Sony Interactive Entertainment LLC, San Mateo, CA (US)

(72) Inventors: Abinadi Willis Johnson, Corona, CA (US); Quan Lau, Redondo Beach, CA (US); Chris Walker, Sherman Oaks, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 735 days.

(21) Appl. No.: 15/360,755

(22) Filed: Nov. 23, 2016

(65) Prior Publication Data
US 2018/0144392 A1 May 24, 2018

(51) Int. Cl.
G06Q 30/00 (2012.01)
G06Q 30/06 (2012.01)

(52) U.S. Cl.
CPC ..... *G06Q 30/0633* (2013.01); *G06Q 30/0623* (2013.01); *G06Q 30/0641* (2013.01)

(58) Field of Classification Search
CPC ..... G06Q 30/06; G06Q 30/0601–0643; G06Q 30/08; G06Q 50/01; G06Q 30/0633; G06Q 30/0641; H04N 21/472; H04N 21/47202; H04N 21/47205; H04N 21/47208; H04N 21/47211; H04N 21/478; H04N 21/4782; H04N 21/47815
See application file for complete search history.

(56) References Cited

U.S. PATENT DOCUMENTS

| 4,521,021 A | 6/1985 | Dixon |
| 4,542,897 A | 9/1985 | Melton et al. |

(Continued)

FOREIGN PATENT DOCUMENTS

| CA | 2106122 | 3/1994 |
| CN | 11008878 A | 8/2019 |

(Continued)

OTHER PUBLICATIONS

"International Search Report" and "Written Opinion of the International Searching Authority", Patent Cooperation Treaty Application No. PCT/US2017/061276, dated Jan. 18, 2018, 13 pages.

(Continued)

*Primary Examiner* — William J Allen
(74) *Attorney, Agent, or Firm* — Carr & Ferrell LLP

(57) ABSTRACT

A system for custom categorization of digital media content includes a server and a database for storing user accounts. The server provides a user interface to allow a user to review, purchase, and download to a user device one or more digital products. The server further establishes one or more wish lists of the user upon receipt of user instructions, where each of the wish lists is associated with the user account. The server further receives a user selection of one of the digital products. The user selection can also indicate a selected wish list of the user. In response to the user selection, the server links a selected digital product with the selected wish list. The user interface is further configured to allow the user to review all digital products linked to all of the wish lists of the user.

20 Claims, 16 Drawing Sheets

(56) References Cited

U.S. PATENT DOCUMENTS

| | | |
|---|---|---|
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,740,549 A | 4/1998 | Reilly et al. |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford et al. |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,964,664 A | 10/1999 | Cook et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,174,236 B1 | 1/2001 | Tsuda et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,366,947 B1 | 4/2002 | Kavner |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |

(56) References Cited

U.S. PATENT DOCUMENTS

| | | |
|---|---|---|
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto et al. |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,995,788 B2 | 2/2006 | James |
| 7,047,302 B1 | 5/2006 | Chatani et al. |
| 7,072,849 B1 | 7/2006 | Filepp et al. |
| 7,085,733 B2 | 8/2006 | Ebisawa |
| 7,086,187 B2 | 8/2006 | Bandak |
| 7,136,871 B2 | 11/2006 | Ozer et al. |
| 7,171,480 B2 | 1/2007 | Chatani |
| 7,305,442 B1 | 12/2007 | Lundy |
| 7,421,454 B2 | 9/2008 | DeShan et al. |
| 7,761,328 B2 | 7/2010 | Kutaragi et al. |
| 7,895,076 B2 | 2/2011 | Kutaragi et al. |
| 8,196,168 B1 | 6/2012 | Bryan et al. |
| 2001/0010757 A1 | 8/2001 | Mori et al. |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0013177 A1 | 1/2002 | Richter |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0046905 A1 | 4/2002 | Hulkkonen et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak et al. |
| 2002/0087403 A1 | 7/2002 | Meyers et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |

(56) References Cited

U.S. PATENT DOCUMENTS

| | | |
|---|---|---|
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | DeWolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0116284 A1 | 8/2002 | Steelman et al. |
| 2002/0120589 A1 | 8/2002 | Aoki |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0122864 A1 | 7/2003 | Jenne et al. |
| 2003/0126150 A1 | 7/2003 | Chan |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0149618 A1 | 8/2003 | Sender et al. |
| 2003/0149623 A1 | 8/2003 | Chen |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172005 A1* | 9/2003 | Hellal .................... G06Q 30/02 705/14.51 |
| 2003/0172376 A1 | 9/2003 | Coffin |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0212608 A1 | 11/2003 | Cliff |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Alfieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |

(56) References Cited

U.S. PATENT DOCUMENTS

| | | |
|---|---|---|
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton et al. |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0003839 A1 | 1/2005 | Tripp |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0107158 A1 | 5/2005 | Kanisawa et al. |
| 2005/0113170 A1 | 5/2005 | McHugh |
| 2005/0114526 A1 | 5/2005 | Aoyama |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0215310 A1 | 9/2005 | Boyd et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0256768 A1 | 11/2005 | Robinson |
| 2005/0261062 A1 | 11/2005 | Lewin et al. |
| 2005/0261962 A1 | 11/2005 | Chuah |

(56) References Cited

U.S. PATENT DOCUMENTS

| | | |
|---|---|---|
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0085517 A1 | 4/2006 | Kaurila |
| 2006/0167747 A1 | 7/2006 | Goodman et al. |
| 2006/0179453 A1 | 8/2006 | Kadie et al. |
| 2006/0212350 A1 | 9/2006 | Ellis et al. |
| 2006/0230141 A1 | 10/2006 | Willis |
| 2006/0245504 A1 | 11/2006 | Ogikubo et al. |
| 2006/0248209 A1 | 11/2006 | Chiu et al. |
| 2006/0253323 A1 | 11/2006 | Phan et al. |
| 2006/0265503 A1 | 11/2006 | Jones et al. |
| 2006/0268667 A1 | 11/2006 | Jellison et al. |
| 2007/0027760 A1 | 2/2007 | Collins et al. |
| 2007/0027771 A1 | 2/2007 | Collins et al. |
| 2007/0027852 A1 | 2/2007 | Howard et al. |
| 2007/0038931 A1 | 2/2007 | Allaire et al. |
| 2007/0043616 A1 | 2/2007 | Kutaragi et al. |
| 2007/0050254 A1 | 3/2007 | Driscoll |
| 2007/0073756 A1 | 3/2007 | Manhas et al. |
| 2007/0078714 A1 | 4/2007 | Ott et al. |
| 2007/0083611 A1 | 4/2007 | Farago et al. |
| 2007/0124134 A1 | 5/2007 | Van Kommer |
| 2007/0130594 A1 | 6/2007 | Hidary et al. |
| 2007/0146812 A1 | 6/2007 | Lawton |
| 2007/0174471 A1 | 7/2007 | Van Rossum |
| 2007/0244760 A1 | 10/2007 | Bodnar et al. |
| 2008/0016188 A1 | 1/2008 | Batni et al. |
| 2008/0097872 A1 | 4/2008 | Peckover |
| 2008/0152300 A1 | 6/2008 | Knee et al. |
| 2008/0206732 A1 | 8/2008 | Zalewski |
| 2008/0250334 A1 | 10/2008 | Price |
| 2008/0288460 A1* | 11/2008 | Poniatowski ...... H04N 21/4334 |
| 2009/0037253 A1 | 2/2009 | Davidow et al. |
| 2009/0183081 A1 | 7/2009 | Rodriguez et al. |
| 2010/0063866 A1 | 3/2010 | Kinoshita et al. |
| 2010/0287070 A1 | 11/2010 | Santeufemia et al. |
| 2010/0306061 A1 | 12/2010 | Wagner |
| 2010/0333137 A1 | 12/2010 | Hamano et al. |
| 2011/0173054 A1 | 7/2011 | Kutaragi et al. |
| 2011/0231873 A1 | 9/2011 | Toebes et al. |
| 2011/0289183 A1* | 11/2011 | Rollins ................. H04W 88/06 709/217 |
| 2012/0066059 A1 | 3/2012 | Berger |
| 2012/0102431 A1 | 4/2012 | Krolczyk et al. |
| 2012/0102573 A1* | 4/2012 | Spooner ............. G06Q 30/0257 726/28 |
| 2012/0123865 A1* | 5/2012 | Salzano ............. G06Q 30/0257 705/14.55 |
| 2013/0110980 A1 | 5/2013 | Benn et al. |
| 2014/0058766 A1 | 2/2014 | Yu et al. |
| 2014/0122203 A1* | 5/2014 | Johnson ................ G06Q 30/00 705/14.23 |
| 2015/0058873 A1 | 2/2015 | Newell et al. |
| 2015/0332232 A1 | 11/2015 | Wright |
| 2016/0044090 A1* | 2/2016 | Glickfield ............... H04L 67/10 709/204 |
| 2016/0117754 A1* | 4/2016 | DeStefano ......... G06Q 30/0633 705/26.8 |
| 2016/0180447 A1* | 6/2016 | Kamalie ............ G06Q 30/0643 705/27.2 |
| 2016/0248865 A1 | 8/2016 | Dotan-Cohen et al. |
| 2016/0253631 A1 | 9/2016 | Jones et al. |
| 2017/0289619 A1 | 10/2017 | Xu et al. |
| 2018/0098101 A1 | 4/2018 | Pont et al. |
| 2018/0098119 A1 | 4/2018 | Overcash et al. |
| 2018/0108054 A1* | 4/2018 | Doubinski ......... G06Q 30/0283 |
| 2018/0174110 A1 | 6/2018 | Cvetkovic et al. |
| 2019/0208283 A1 | 7/2019 | Sanghavi |

FOREIGN PATENT DOCUMENTS

| | | |
|---|---|---|
| CN | 111512635A A | 8/2020 |
| EP | 0337539 | 10/1989 |
| EP | 0405776 | 1/1991 |
| EP | 0620688 | 10/1994 |
| EP | 0625760 | 11/1994 |
| EP | 0743595 | 5/1996 |
| EP | 3555728 A1 | 10/2019 |
| GB | 2141907 | 1/1985 |
| GB | 2194369 | 3/1988 |
| JP | H01220925 | 9/1989 |
| JP | H06335569 | 12/1994 |
| JP | H08117445 | 5/1996 |
| JP | H08173634 | 7/1996 |
| JP | H08280934 | 10/1996 |
| JP | 2001321556 | 11/2001 |
| JP | H2002366971 | 12/2002 |
| JP | 2003248844 | 9/2003 |
| JP | 2004298469 | 10/2004 |
| JP | 2008527476A A | 7/2008 |
| JP | 2010176321A A | 12/2010 |
| WO | WO1993014462 | 7/1993 |
| WO | WO1993019427 | 9/1993 |
| WO | WO1993022017 | 11/1993 |
| WO | WO1993023125 | 11/1993 |
| WO | WO1995012442 | 5/1995 |
| WO | WO1995012853 | 5/1995 |
| WO | WO1999059097 | 11/1999 |
| WO | WO2003032127 | 4/2003 |
| WO | WO2005086969 | 9/2005 |
| WO | WO2018118268 A1 | 6/2018 |
| WO | WO2019135826 A1 | 7/2019 |

OTHER PUBLICATIONS

Price Waterhouse Coopers, "IAB Online Ad Measurement Study," Dec. 2001; 1-52.

Nielsen Media Research, "What TV Ratings Really Mean (and Other Frequently-Asked Questions)." Jun. 2005 (7 pages).

Business Wire, "RTIME Announces First 100-Person Twitch Game for Internet; "RTIME Rocks!" Demonstrates the Sower of RTIME Interactive Networking Engine to Support Large Scale, High Performance, Internet Game Play." Look Smart: Find Articles: Apr. 14, 1997. (3 pages).

Business Wire, "Juno Launches America's First Free Internet E-mail Service; Initial Advertisers Include Lands' End, Miramax and Snapple", Apr. 19, 1996. (4 pages).

Office Action, dated Oct. 13, 2009, U.S. Appl. No. 11/400,031, filed Apr. 7, 2006.

Final Office Action, dated Jan. 28, 2010, U.S. Appl. No. 11/400,031, filed Apr. 7, 2006.

Office Action, dated May 4, 2010, U.S. Appl. No. 11/400,031, filed Apr. 7, 2006.

Notice of Allowance, dated Oct. 14, 2010, U.S. Appl. No. 11/400,031, filed Apr. 7, 2006.

Office Action, dated Mar. 14, 2013, U.S. Appl. No. 13/007,525, filed Jan. 14, 2011.

Final Office Action, dated Sep. 25, 2013, U.S. Appl. No. 13/007,525, filed Jan. 14, 2011.

Office Action, dated Nov. 29, 2013, U.S. Appl. No. 13/007,525, filed Jan. 14, 2011.

Final Office Action, dated Apr. 28, 2014, U.S. Appl. No. 13/007,525, filed Jan. 14, 2011.

Advisory Action, dated Jul. 25, 2014, U.S. Appl. No. 13/007,525, filed Jan. 14, 2011.

Office Action, dated Aug. 17, 2015, U.S. Appl. No. 13/007,525, filed Jan. 14, 2011.

Final Office Action, dated Jan. 8, 2016, U.S. Appl. No. 13/007,525, filed Jan. 14, 2011.

Office Action, dated Nov. 19, 2009, U.S. Appl. No. 11/241,229, filed Sep. 30, 2005.

Office Action, dated Dec. 10, 2009, U.S. Appl. No. 11/535,370, filed Sep. 26, 2006.

(56) References Cited

OTHER PUBLICATIONS

Final Office Action, dated Jan. 26, 2010, U.S. Appl. No. 11/240,655, filed Sep. 30, 2005.
Final Office Action, dated Apr. 21, 2010, U.S. Appl. No. 11/452,848, filed Jun. 13, 2006.
Final Office Action, dated Jun. 8, 2010, U.S. Appl. No. 11/535,370, filed Sep. 26, 2006.
Final Office Action, dated Apr. 23, 2010, U.S. Appl. No. 11/241,229, filed Sep. 30, 2005.
Advisory Action, dated Jun. 9, 2010, U.S. Appl. No. 11/240,655, filed Sep. 30, 2005.
Advisory Action, dated Aug. 18, 2010, U.S. Appl. No. 11/535,370, filed Sep. 26, 2006.
Office Action, dated Sep. 28, 2016, U.S. Appl. No. 13/007,525, filed Jan. 14, 2011.
"International Search Report" and "Written Opinion of the International Searching Authority", Patent Cooperation Treaty Application No. PCT/US2018/058677, dated Dec. 17, 2018, 12 pages.
Unknown, "Software: Yahoo Widgets Engine," Sep. 6, 2006 [retrieved on May 23, 2019], Retrieved from the Internet: <URL:https://www.windowstipoftheday.blogspot.com/2006/09/software-yahoo-widgets-engine.html>, 3 pages.
"Extended European Search Report", European Application No. 17883956.9, dated Jun. 12, 2020, 9 pages.
"Office Action", Japan Patent Application No. 2019-532735, dated Sep. 1, 2020, 3 pages [7 pages with translation].

\* cited by examiner

*FIG. 7*

CUSTOM PRODUCT CATEGORIZATION OF DIGITAL MEDIA CONTENT

BACKGROUND

This disclosure generally relates to online digital content stores. More particularly, this disclosure relates to a system and method for custom categorization of digital media content by establishing a plurality of wish lists. The system and method of this disclosure can be applicable, for example, in an online digital content store such as PlayStation™ store.

It is currently common for customers to purchase products and services online using computers or mobile devices. Among products that can be purchased online are digital media content, including video, audio, television shows, computer games, and so forth. When a user purchases a digital media content product, the media content product can be downloaded to a user device. Online stores of digital media content can maintain user accounts for storing certain user information or preferences, which can facilitate the overall purchasing experience and interactions between the online store and the user. However, there is still need to enhance consumer shopping experience.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect of this disclosure, there is provided a system for custom categorization of digital media content. The system comprises a server that includes at least one processor, a non-transitory computer-readable medium including a computer-executable program code, and a network interface configured to operatively connect the server with a plurality of remote user devices. The system further includes a database hosted by the server. The database stores at least a first user account. When the computer-executable program code is executed by the at least one processor, the at least one processor provides a first user interface for a first user of the first user account, where the first user interface enables the first user to review, purchase, and download to a first user device one or more digital products. The processor further establishes one or more wish lists of the first user upon receipt of one or more user instructions of the first user, where each of the wish lists of the first user is associated with the first user account. The processor further receives a first user selection of one of the digital products. The first user selection can indicate a selected wish list of the first user. In response to the first user selection, the processor links a selected digital product with the selected wish list. The first user interface is further configured to enable the first user to review all digital products linked to all of the wish lists of the first user.

In another aspect of this disclosure, there is provided a computer-implemented method for custom categorization of digital media content. The method comprises maintaining, by a server, a first user account. The method further comprises providing, by the server, a first user interface for a first user of the first user account. The first user interface can enable the first user to review, purchase, and download to a first user device one or more digital products. The method further comprises establishing, by the server, one or more wish lists of the first user upon receipt of one or more user instructions of the first user. Each of the wish lists of the first user is associated with the first user account. The method further comprises receiving, by the server, a first user selection of one of the digital products. The first user selection further indicates a selected wish list of the first user. The method further comprises, linking, in response to the first user selection, a selected digital product with the selected wish list. The first user interface is further configured to enable the first user to review all digital products linked to all of the wish lists of the first user.

In another aspect of the disclosure, there is provided a non-transitory processor-readable medium having instructions stored thereon, which when executed by one or more processors, cause the one or more processors to implement the above outlined method for custom categorization of digital media content. Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 7 shows a graphical user interface of the online digital content store featuring content of another wish list.

Figure 1:
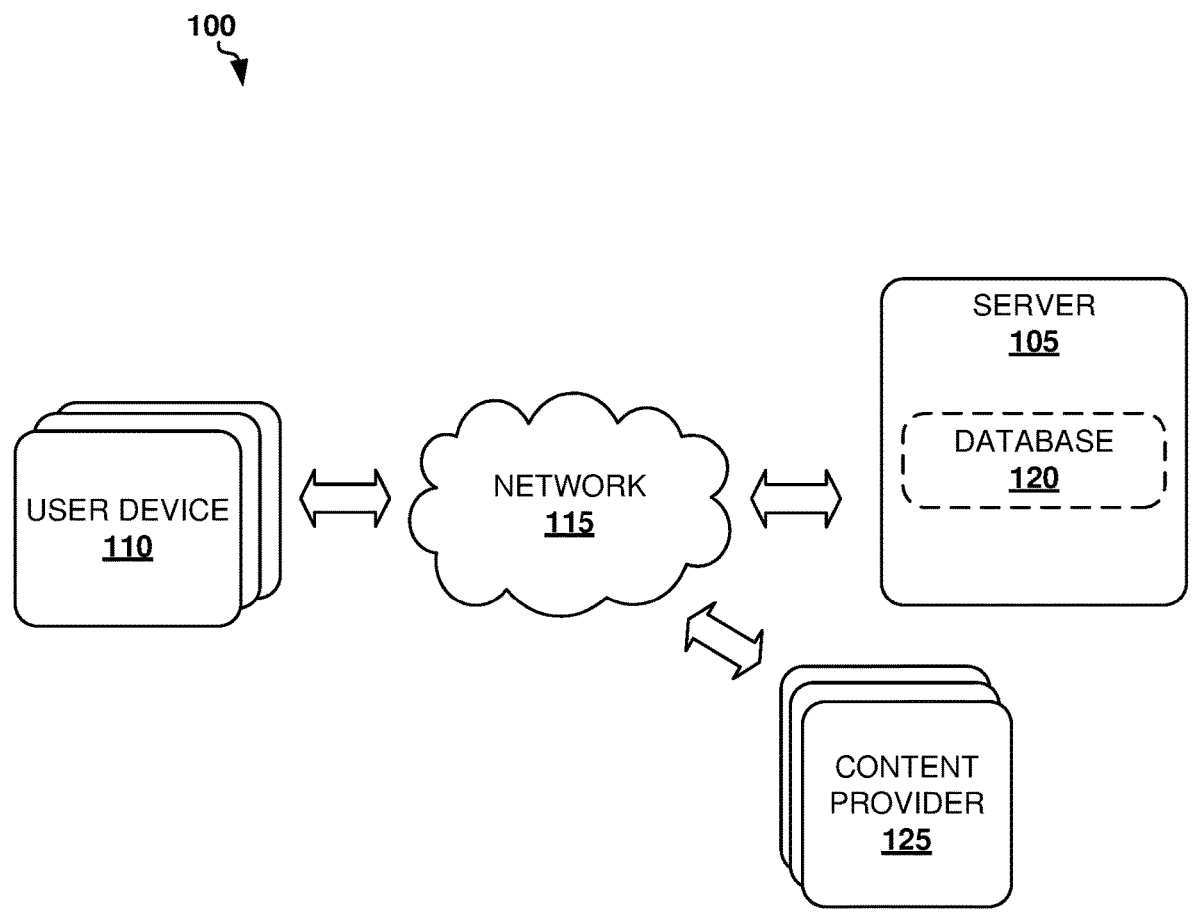
FIG. 1 shows a block diagram illustrating a system for custom categorization of digital media content.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or disclosure in a commercially feasible embodiment are often not depicted in order to facilitate a less obstructed view of these various embodiments of the present disclosure

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, database queries, database structures, hardware modules, hardware circuits, hardware chips, and the like, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure Aspects of the embodiments will now be presented with reference to a system and methods for custom categorization of digital media content. These system and methods are described in this section and illustrated in the accompanying drawings by various blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

The term "user device" shall mean any electronic device configured to process and display data. By way of example, not limitation, some examples of user devices include a mobile device, cellular phone, user equipment, terminal, mobile phone, smart phone, Internet phone, tablet computer, laptop computer, desktop computer, workstation, thin client, personal digital assistant, music player, multimedia player, game console, navigation system, television system, netbook, home gateway, broadband gateway, network appliance, set top box, access gateway, networking switch, entertainment system, infotainment system, and in-vehicle computer. The terms "user device" and "remote user device" can be used interchangeably.

The term "digital product" shall be construed to mean one or more of the following: media content, multimedia content, entertainment content, video, video-on-demand, pay-per-view video, audio, music, television show, television program, movie, computer game, video game, Internet game, network game, console game, virtual reality content, electronic book, and electronic magazine. According to embodiments of this disclosure, digital products can be for purchase only products. The terms "digital content" and "digital product" can be used interchangeably.

The term "user interface" may refer to the software, the display screens, and/or the functionality provided by embodiments of this disclosure that facilitate at least the accessing, reviewing, and purchasing of digital products by users. Accordingly, the term "user interface" may refer to a graphical user interface enabling a user to interact with the system or may refer to a computer programming interface (API) for establishing data communication between the user device and server.

The term "wish list" shall mean a list of references to items (such as a list of digital products) that are of interest to a user. For example, the wish list may include items that the user potentially desires as a gift from or to another user, or that the user is considering purchasing for himself in the future. The term "wish list" may also refer to gift registries and other lists or collections of items of interest to a creator or owner of the wish list. While the disclosure refers to wish lists in an electronic commerce context, those skilled in the art will recognize that the following description may also apply to items in contexts other than the e-commerce. Moreover, a wish list may be created and maintained by an entity other than a person, such as an organization, a team, a couple, a family, and the like. Moreover, while a wish list may generally be used in examples disclosed herein, items of the wish lists may be attributed to, added, modified, updated, or removed from the wish lists. In regard to adding a digital product to a wish list (such as adding video files, electronic books, or computer games), it should be understood that, in general, this process refers to adding a reference to a certain digital product on the wish list. Accordingly, the process of placing a digital product on a wish list should be understood as a reference to the certain digital product (such as an identifier identifying the digital product) placed on the wish list or included in the wish list. Similarly, the process of removing a digital product from a wish list generally refers to removing or deleting the reference to the digital product from the wish list.

The embodiments of this disclosure allow a user of online stores and electronic commerce stores, such as an online digital content store (e.g., PlayStation™ store), to create a plurality of wish lists to enable the user to categorize items, such as digital products, with the help of the wish list. The embodiments also allow the user to share the wish lists and digital products stored in the wish lists with other users, thereby promoting cooperation. The present disclosure also relates to the "wish list feature" for PlayStation™ game console or other related products.

Referring now to the drawings, example embodiments are described. The drawings are schematic illustrations of idealized example embodiments. Thus, the example embodiments discussed herein should not be construed as limited to the particular illustrations presented herein; rather, these example embodiments can include deviations and differ from the illustrations presented herein.

FIG. 1 shows a block diagram illustrating a system 100 for custom categorization of digital media content, according to one example embodiment. System 100 includes a server 105 including at least one processor, computer-readable medium for storing a database 120, and computer-implementable instructions, and a network interface for enabling the server to communicate with other elements of the system. Server 105 maintains and provides an online store such as online digital content store or PlayStation™ store for selling digital products to users.

Server 105 can be in operative communication with one or more user devices 110 via one or more communications networks 115. As explained above, user devices 110 are operated by users and can refer to a personal computer, game console, mobile device, and the like. Communications network 115 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, Internet Protocol (IP) communications network, or any other data communication network utilizing physical layers, link layer capability, or network layer to carry data packets, or any combinations of the above-listed data networks.

System 100 also includes one or more content providers 125 such as server computers that can store digital products. The digital products can be transmitted or broadcasted to selected user devices 110 based on instructions received from server 105. For example, when a user of one of user devices 110 accesses the online store maintained by server 105 and purchases a certain digital product, it can be downloaded from one of content providers 125 to the respective user device 110; or user device 110 can be granted access to content provider 125 to access the purchased digital product.

Database 120 can maintain user accounts, user settings, user preferences, user personal information, user payment information, and optionally some digital products. Database 120 can be a relational database storing identifiers or references of digital products associated with user identifiers or user accounts.

As explained herein, the user of user device 110 can access the online store maintained by server 105 to create one or more wish lists. The user can add one or more digital products to selected wish lists at his discretion. Each of the wish lists can be provided with a unique identifier and further stored in database 120. Accordingly, relational database 120 can cross-reference identifiers of wish lists and identifiers of digital products and user accounts.

An example implementation of user device 110 and server 105 is further illustrated in FIG. 16 and explained below. The following FIGS. 2-14 illustrate various graphical user interfaces (display screens) of the online digital content store and serve to explain the process of creating and managing wish lists by users of the online digital content store. The graphical user interfaces of FIGS. 2-14 can be displayed on a display of user devices 110.

Figure 2:
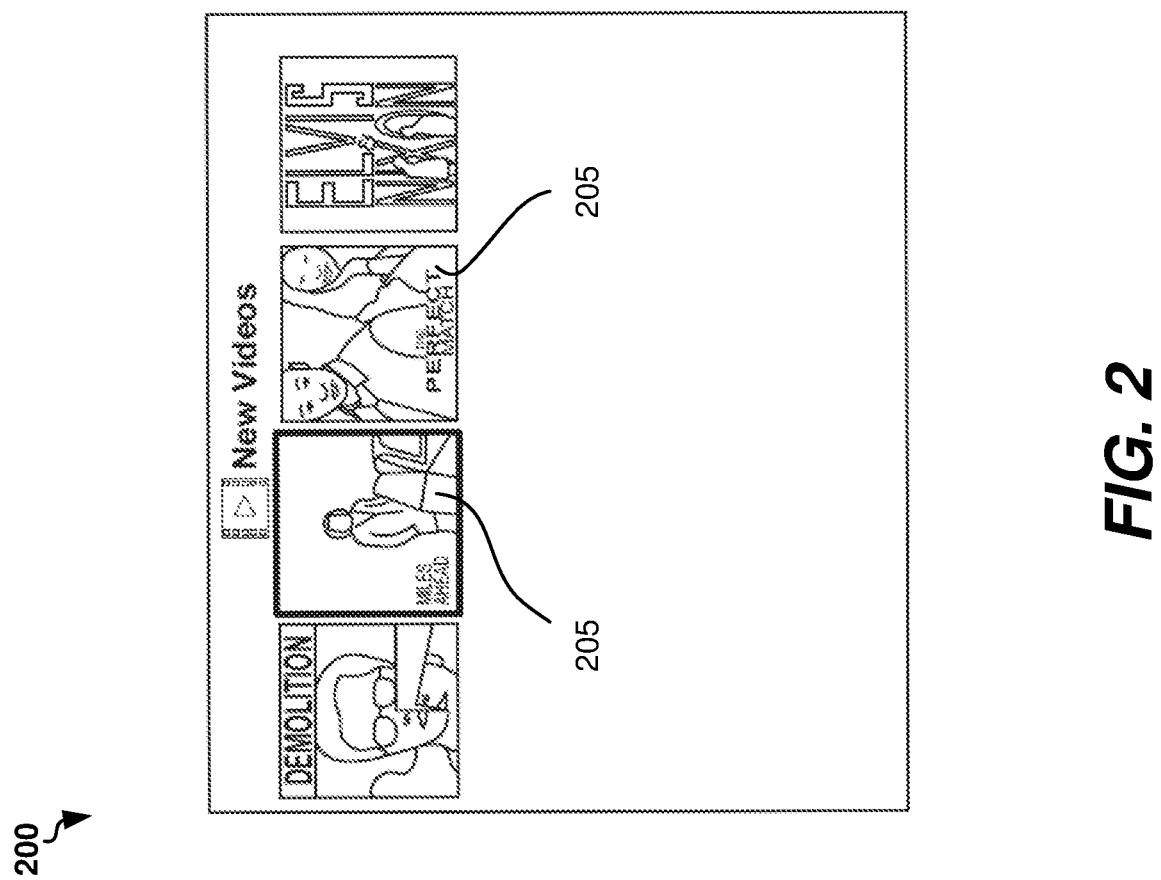
FIG. 2 shows an example graphical user interface of an online digital content store featuring new digital products for purchase.

FIG. 2 shows an example portion of a graphical user interface 200 of an online digital content store showing new digital products for purchase, according to one embodiment. The online digital content store is maintained by server 105 as explained above. Graphical user interface 200 includes a plurality of widgets or icons 205, each of which represents a certain digital product such as a movie, television show, video game, and the like. The user can review the available digital products and select one of them by clicking on one of icons 205. When the user clicks (or otherwise enables) one of icons 205, a graphical user interface 300 of FIG. 3 appears.

Figure 3:
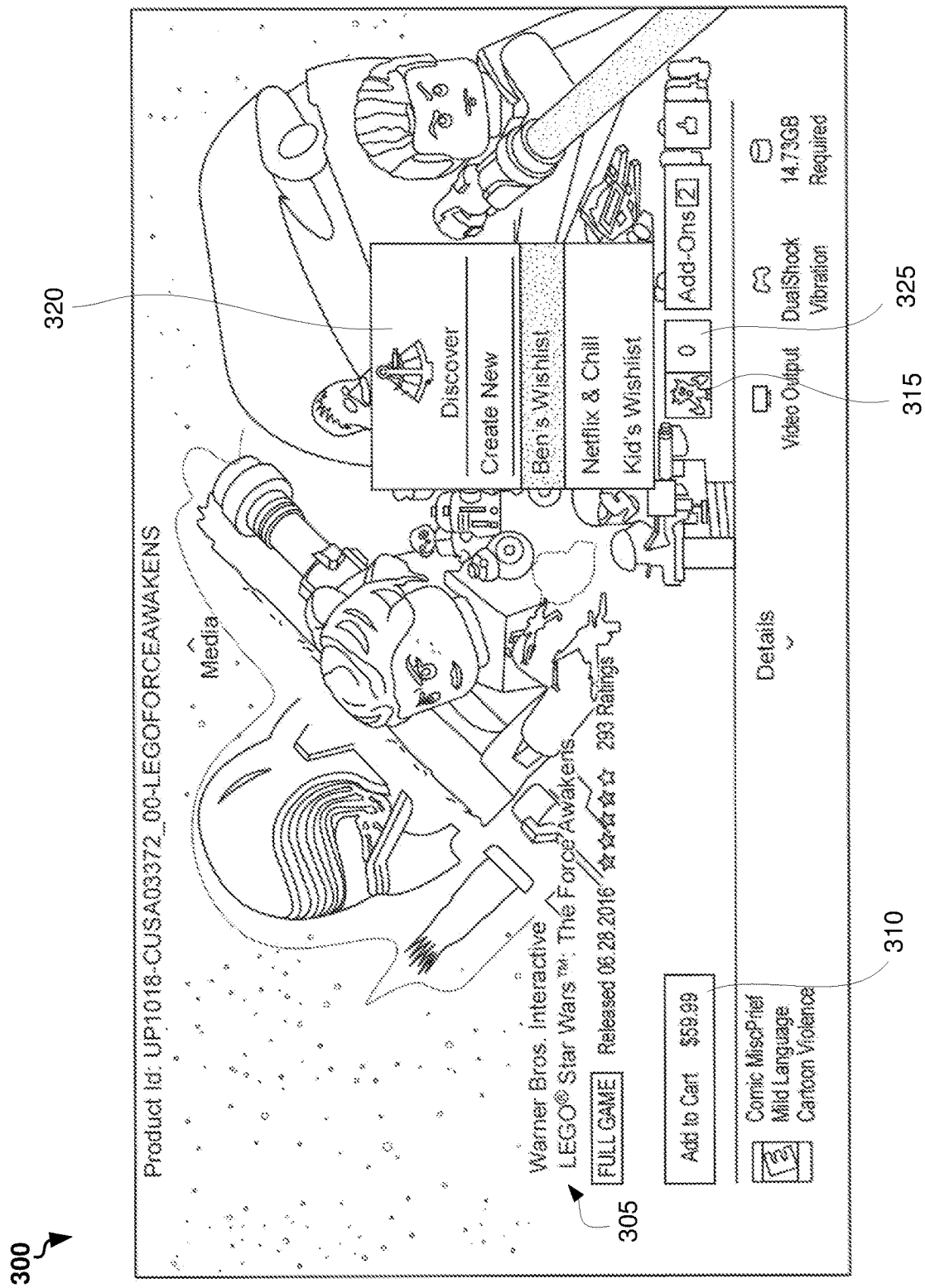
FIG. 3 shows a graphical user interface of an online digital content store featuring a selected digital product before its added to a selected wish list.

Particularly, FIG. 3 shows graphical user interface 300 of the online digital content store showing a selected digital product, according to one embodiment. As shown in the figure, graphical user interface 300 includes a graphical image of a selected digital product which can be, for example, the "LEGO Star Wars: The Force Awakens" video game. Graphical user interface 300 further includes digital product description 305, which may include one or more of the following: a title of digital product, brief description of digital product, rank of digital product, and one or more hyperlinks or other clickable or soft buttons. Graphical user interface 300 further includes a clickable or soft button 310, which, when enabled by the user, causes the purchase, order, or pre-order of the digital product for the price provided inside the button 310.

Graphical user interface 300 further includes a user icon 315 showing an avatar of the user. Graphical user interface 300 also includes an icon 325 showing a number or count of digital products (items) in one or more of user's wish lists. In the beginning of operation, icon 325 displays "0" items in the wish lists.

When the user clicks on user icon 315 (or another dedicated button), a wish list menu 320 appears as shown in FIG. 3. Wish list menu 320 includes a list of previously created wish lists of the user. For example, the wish lists can be names such as "Ben's Wishlist," "Netflix & Chill," "Kid's Wishlist," and the like. The user can place the current digital product (i.e., "LEGO Star Wars: The Force Awakens" video game) into one of the existing wish lists shown in wish list menu 320. The user can also create one or more new wish lists through wish list menu 320, as will be explained later, for placing the current digital product into it.

Figure 4:
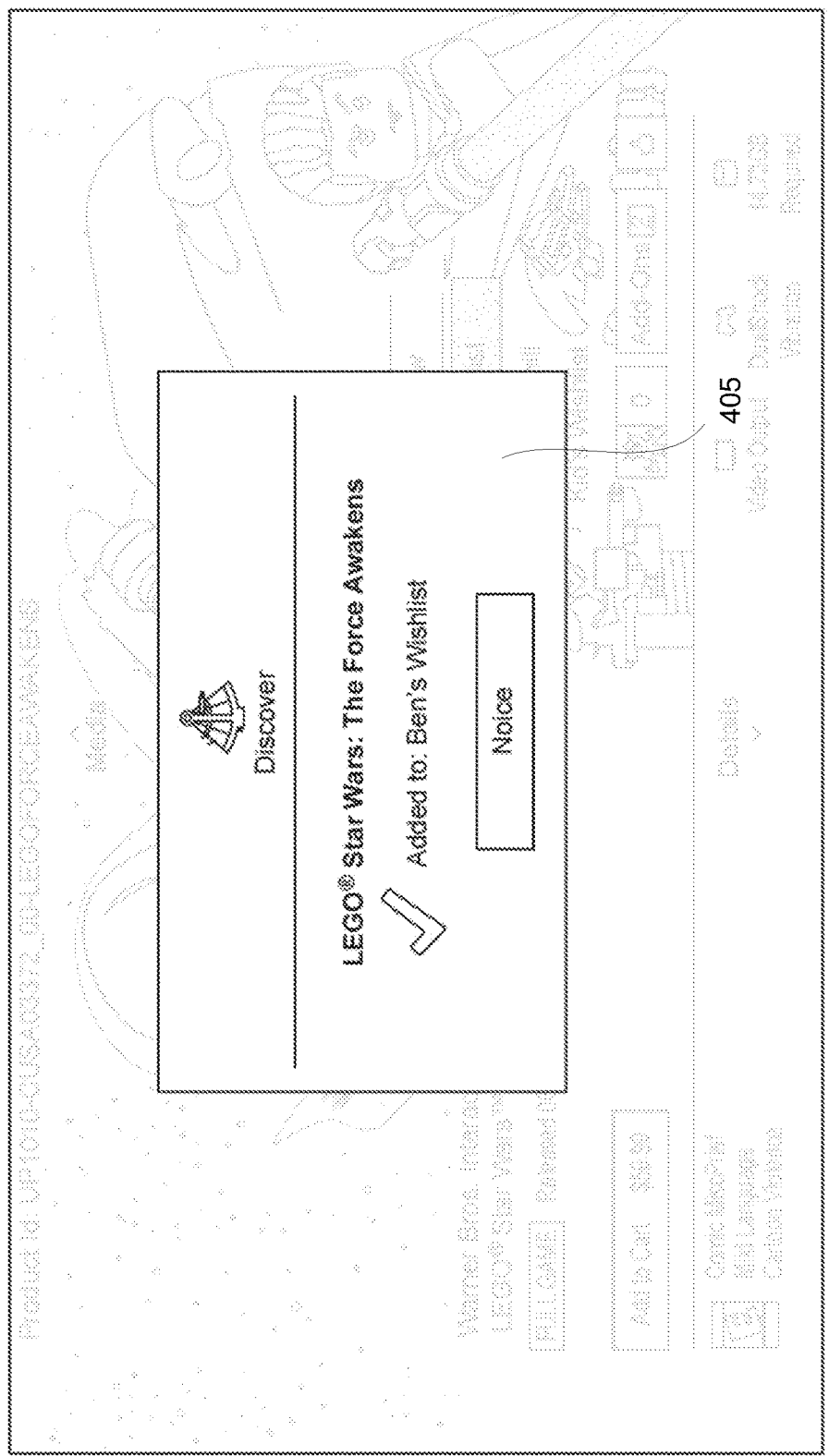
FIG. 4 shows a graphical user interface of an online digital content store featuring a message of successful placement of a selected digital product on a selected wish list.
Figure 5:
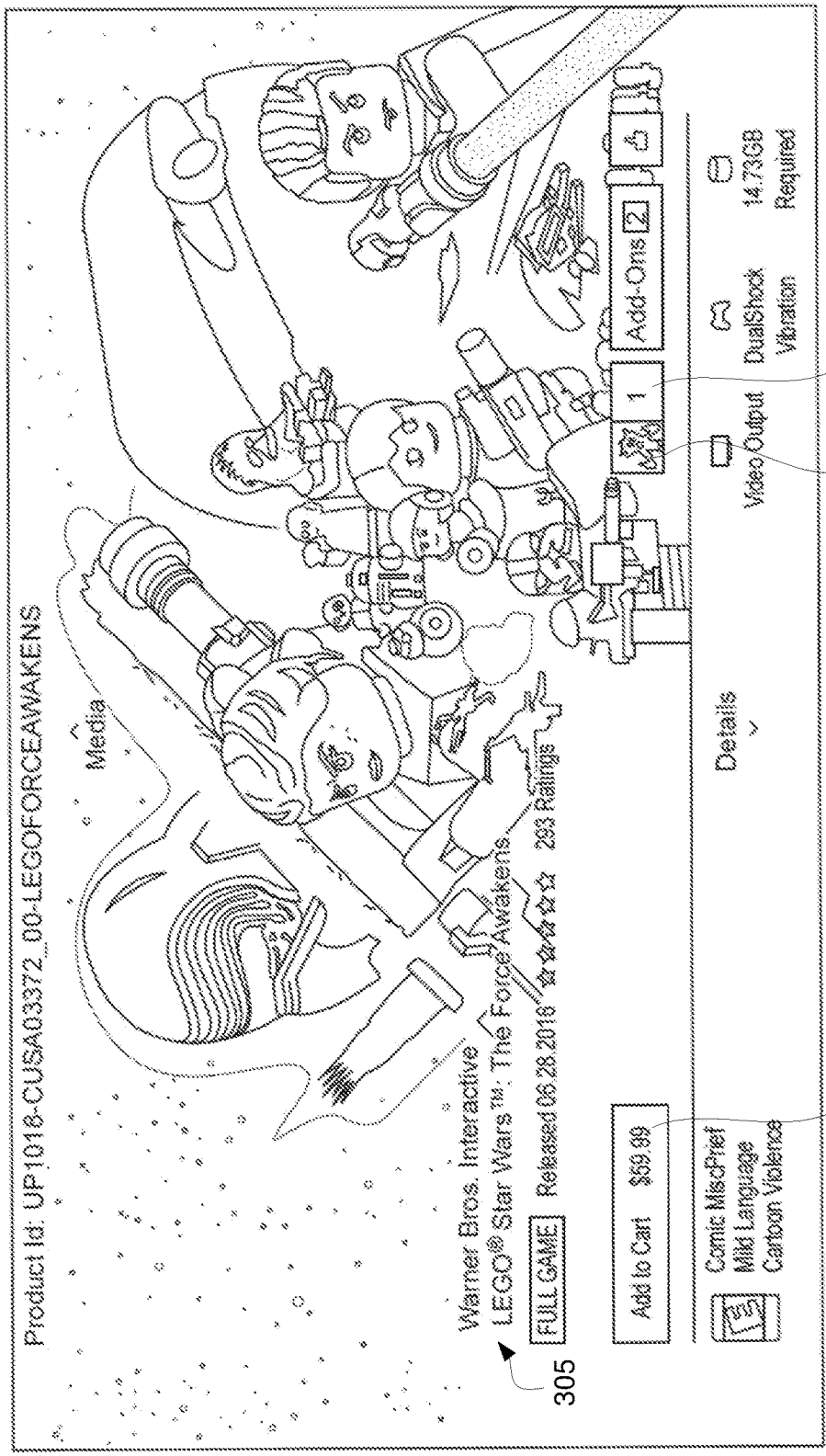
FIG. 5 shows the graphical user interface as shown in FIG. 3 after the selected digital product is added to the selected wish list.

In an example operation, the user selects the "Ben's Wishlist" and clicks on a corresponding button in wish list menu 320 or other button to cause the online digital content store to store the currently displayed digital product in "Ben's Wishlist." When the online digital content store places the currently displayed digital product on the selected wish list, the online digital content store displays a graphical user interface 400 of FIG. 4. Particularly, FIG. 4 shows graphical user interface 400 of online digital content store showing a message 405 of successful placement of selected digital product on the selected wish list, according to one embodiment. As shown in the figure, message 405 provides that "LEGO Star Wars: The Force Awakens" video game was added to "Ben's Wishlist." Message 405 can also include a clickable button "Noice" (or "Ok" or "Submit" button) to allow the user to confirm the placement of the digital product on the selected wish list. When the user clicks the "Noice" button, the user device starts showing a graphical user interface 500 of FIG. 5. Graphical user interface 500 substantially replicates graphical user interface 300; however, it does not show wish list menu 320, while icon 325 now displays "1" item in all of the wish lists of the user.

In certain embodiments, the same user device 110 can be used by two or more different users. For example, a family can use the same game console to access the same online digital content store. In these embodiments, the the online digital content store can maintain individual user accounts and enable the users to switch from one user account to another user account. However, because it may be annoying for the users to switch user accounts (e.g., by logging out from the current user account and logging in to another user account), the feature of multiple wish lists of the online digital content store helps these users categorize digital products without changing user accounts. This is especially helpful for those users that use the same user device and same user account for purchasing digital products. Thus, for example, a first user can use the online digital content store to review digital products and place certain digital products of his interest into certain wish lists. Similarly, a second user can access the online digital content store from the same user device as the first user and review digital products and place same or other digital products of her interest into certain one or more wish lists, which may be the same, overlap or differ from the wish lists of the first user. In this case, the process of placing a digital product on a wish list for the second user is the same as for the first user as it was explained above.

Figure 6:
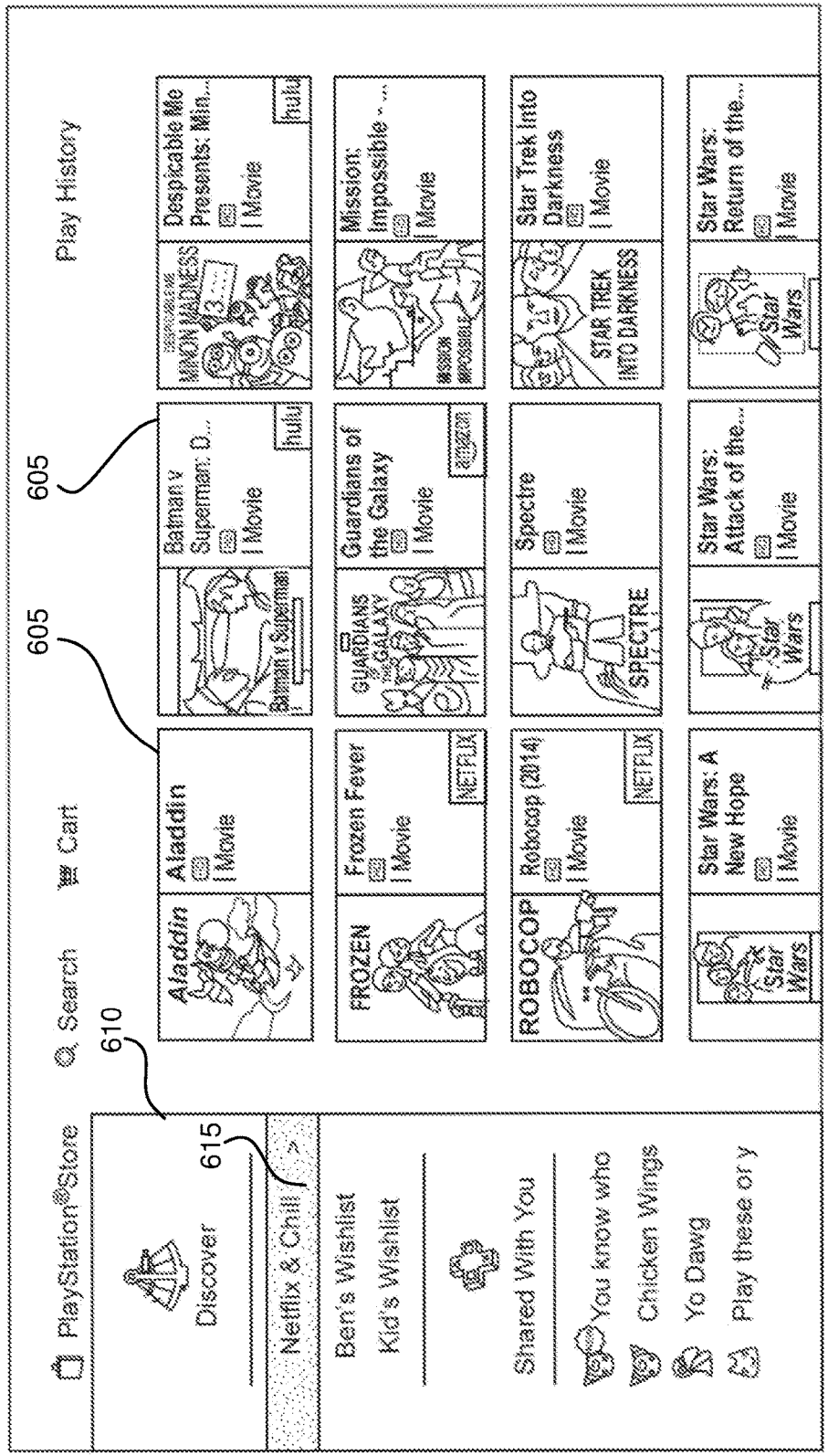
FIG. 6 shows a graphical user interface of the online digital content store featuring wish lists.

Referring now back to the drawings, the user can review all wish lists available to him through a main menu of the online digital content store. For example, FIG. 6 shows a graphical user interface 600 of the online digital content store showing content of one of wish lists, according to one embodiment. Particularly, graphical user interface 600 includes a menu 610 showing all currently existing wish lists that are available to that user. Thus, menu 610 shows a list of wish lists created by the user or other users, but which are all associated with one and the same user account. When the user selects one of the wish lists in menu 610, for example, the "Netflix & Chill" wish list, the right portion of graphical user interface 600 starts displaying digital product icons 605 associated with all digital products previously placed on "Netflix & Chill" wish list. Each of the digital product icons 605 can include an image, title of a digital product, a brief description, and optionally an icon or logo of a content provider. When the user clicks on one of digital product icons 605, the user is enabled to make a purchase of selected digital product.

Figure 7:
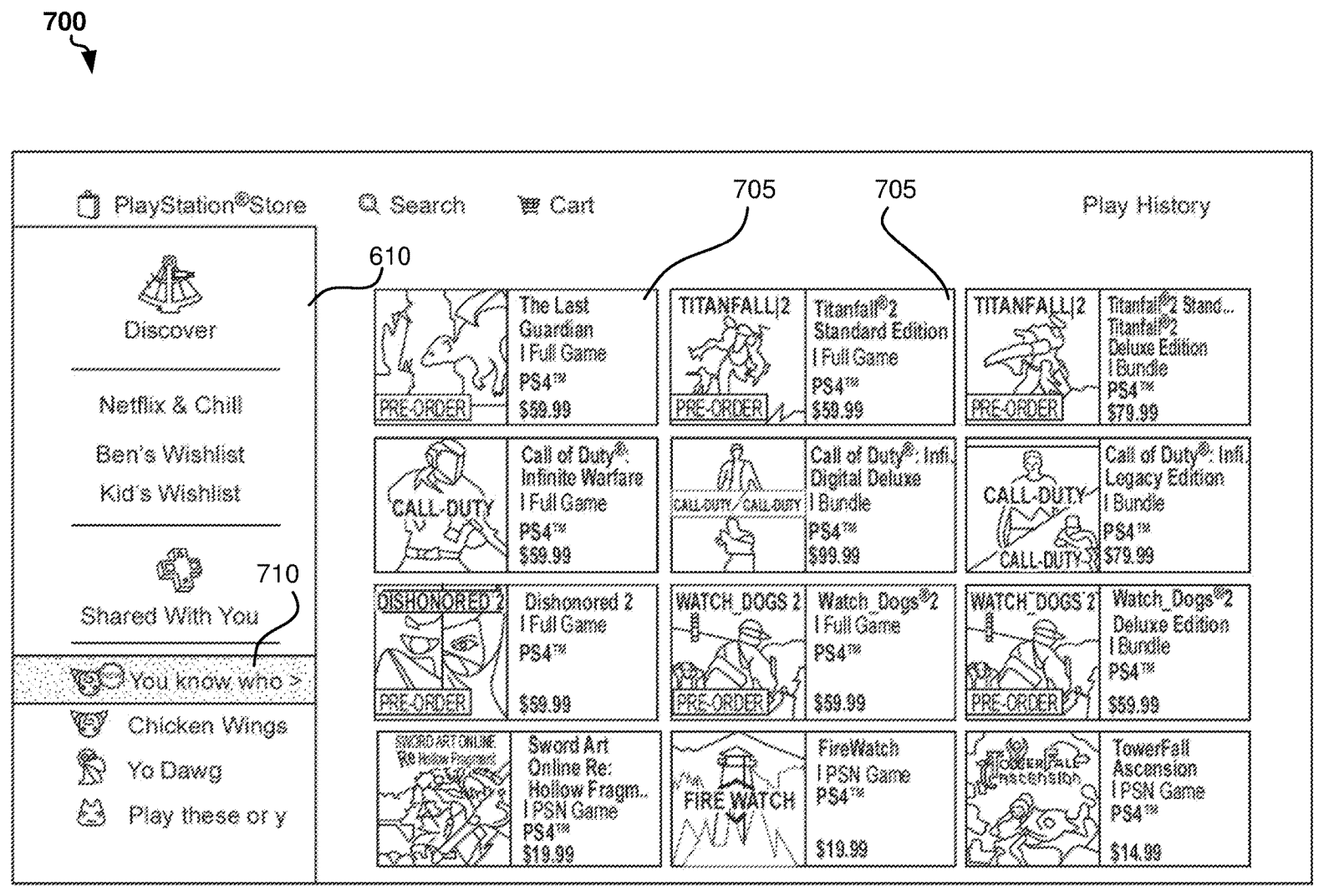

The user can go over through all wish lists to see their contents. For example, FIG. 7 shows a graphical user interface 700 of the online digital content store showing content of a "You know who" wish list. Graphical user interface 700 is substantially the same as graphical user interface 600, but it shows digital products linked to the "You know who" wish list of certain digital products that were shared with the current user. Accordingly, graphical user interface 700 includes digital product icons 705 representing digital products that are linked to the "You know who" wish list shared with the user. The user can click on icons 705 of his interest to review, purchase, and download (access) digital products of his interest.

Figure 8:
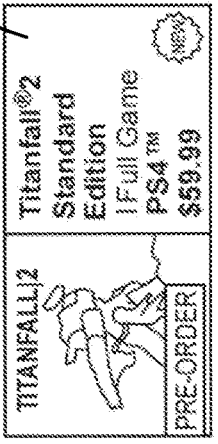
FIG. 8 shows a graphical user interface of the online digital content store showing shared information about certain digital products.

In certain embodiments, the user can also share information about one or more digital products with other users. Moreover, the user can see what information about one or more digital products was shared with him. For example, FIG. 8 shows a graphical user interface 800 of the online digital content store showing shared information about certain digital products. In this drawing, graphical user interface 800 includes indication of another user who shared the information about certain digital products and one or more digital product icons 805. When the user clicks on one of digital product icons 805, the user is enabled to make a purchase of selected digital product or add it to one or more of his wish lists.

Figure 9:
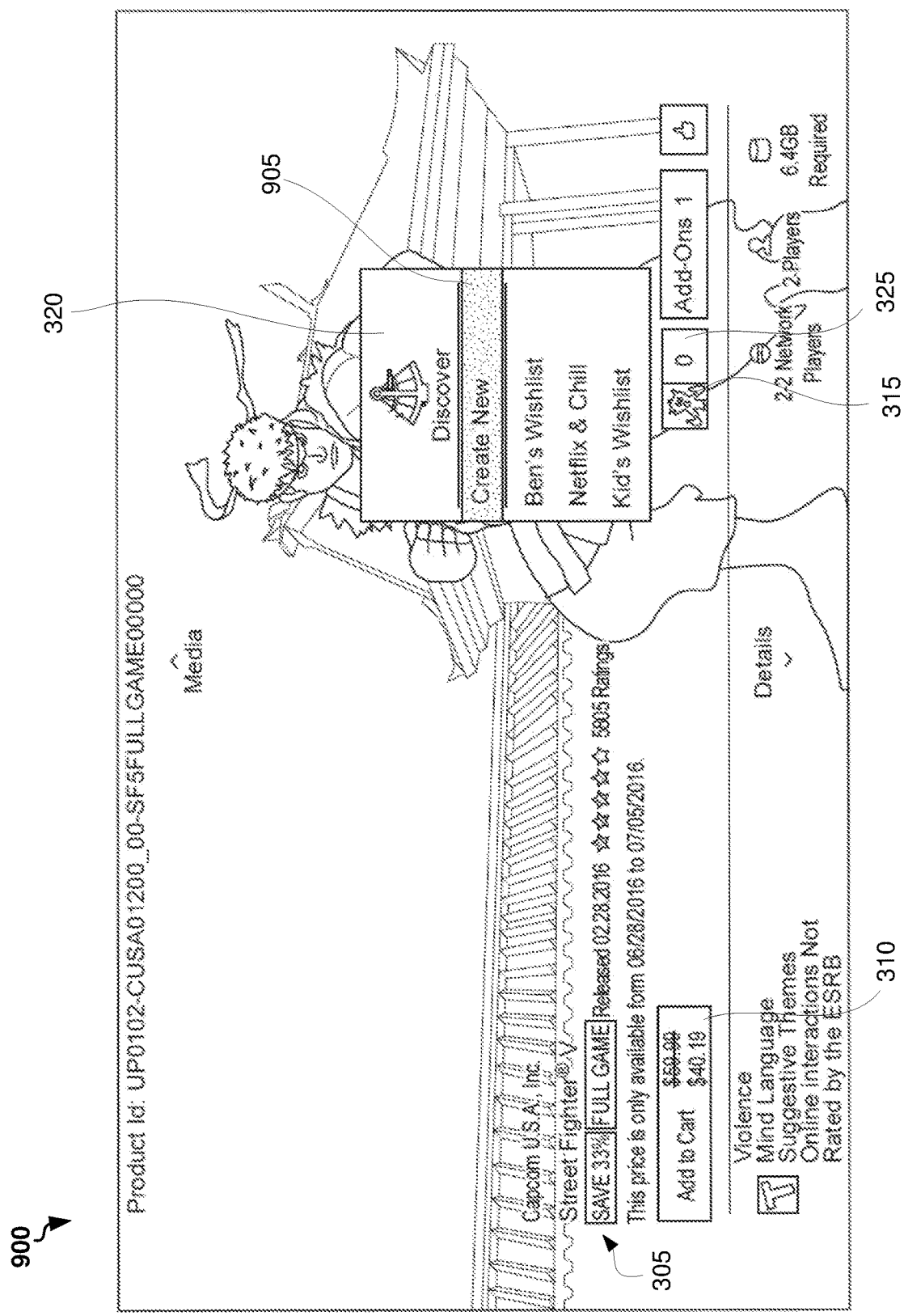
FIG. 9 shows a graphical user interface of the online digital content store allowing creation of a new wish list by a user.
Figure 10:
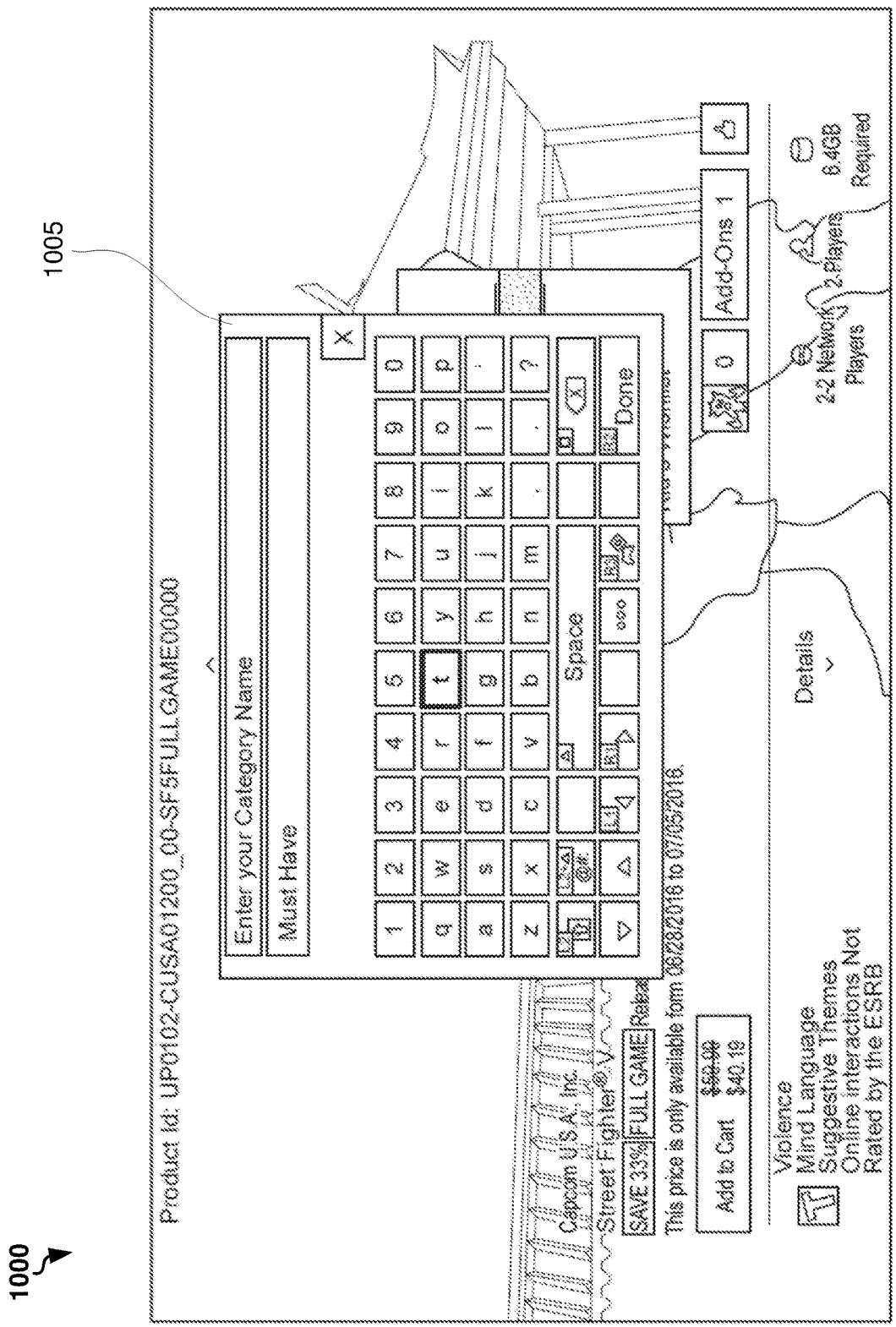
FIG. 10 shows a graphical user interface of the online digital content store with a keyboard widget enabling a user to name a new wish list.
Figure 11:
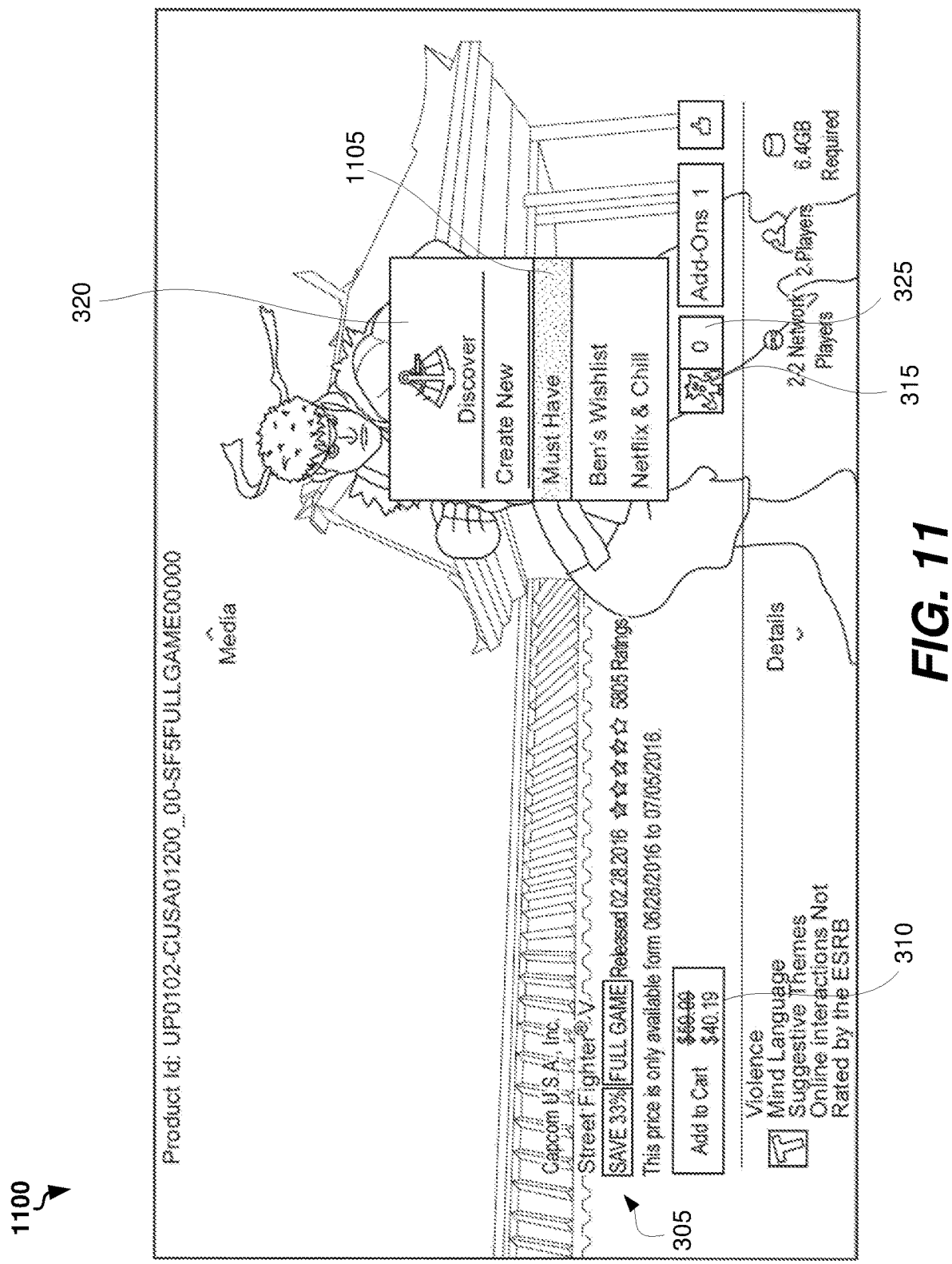
FIG. 11 shows a graphical user interface of the online digital content store displaying a "Must Have" wish list created by the user.

FIG. 9 shows a graphical user interface 900 of the online digital content store enabling a user to create a new wish list, according to one embodiment. Graphical user interface 900 is substantially similar to graphical user interface 300 of FIG. 3. Similarly to FIG. 3, graphical user interface 900 of FIG. 9 includes a graphical image of a selected digital product which can be, for example, the "Street Fighter" video game. Graphical user interface 900 further includes digital product description 305, which may include one or more of the following: a title of digital product, brief description of digital product, rank of digital product, and one or more hyperlinks or other clickable or soft buttons. Graphical user interface 900 includes clickable button 310, which, when enabled by the user, causes the purchase, order, or pre-order of the digital product for the price provided inside the button 310. Graphical user interface 900 further includes user icon 315 showing an avatar of the user and icon 325 showing a number of digital products in one or more of the user's wish lists. Graphical user interface 900 further includes wish list menu 320. When the user wants to create a new wish list, the user selects or clicks "Create New" button 905. After "Create New" button 905 is activated, the user is presented with a graphical user interface 1000 as shown in FIG. 10. Graphical user interface 1000 is substantially the same as graphical user interface 900, but it further includes a keyboard widget 1005 laid over other graphical elements of graphical user interface 1000. The user can use keyboard widget 1005 to name a new wish list. In the example embodiment shown, the user enters "Must Have" as a title of the new wish list. When the user is finished entering the name of his wish list, the user clicks the "Done" button of keyboard widget 1005, which leads to graphical user interface 1100 as shown in FIG. 11. Particularly, FIG. 11 shows graphical user interface 1100 of the online digital content store displaying the just created "Must Have" wish list button 1105 in wish list menu 320. Thus, graphical user interface 1100 is substantially similar to graphical user interface 900 except that graphical user interface 1100 includes "Must Have" wish list button 1105 in wish list menu 320.

Figure 12:
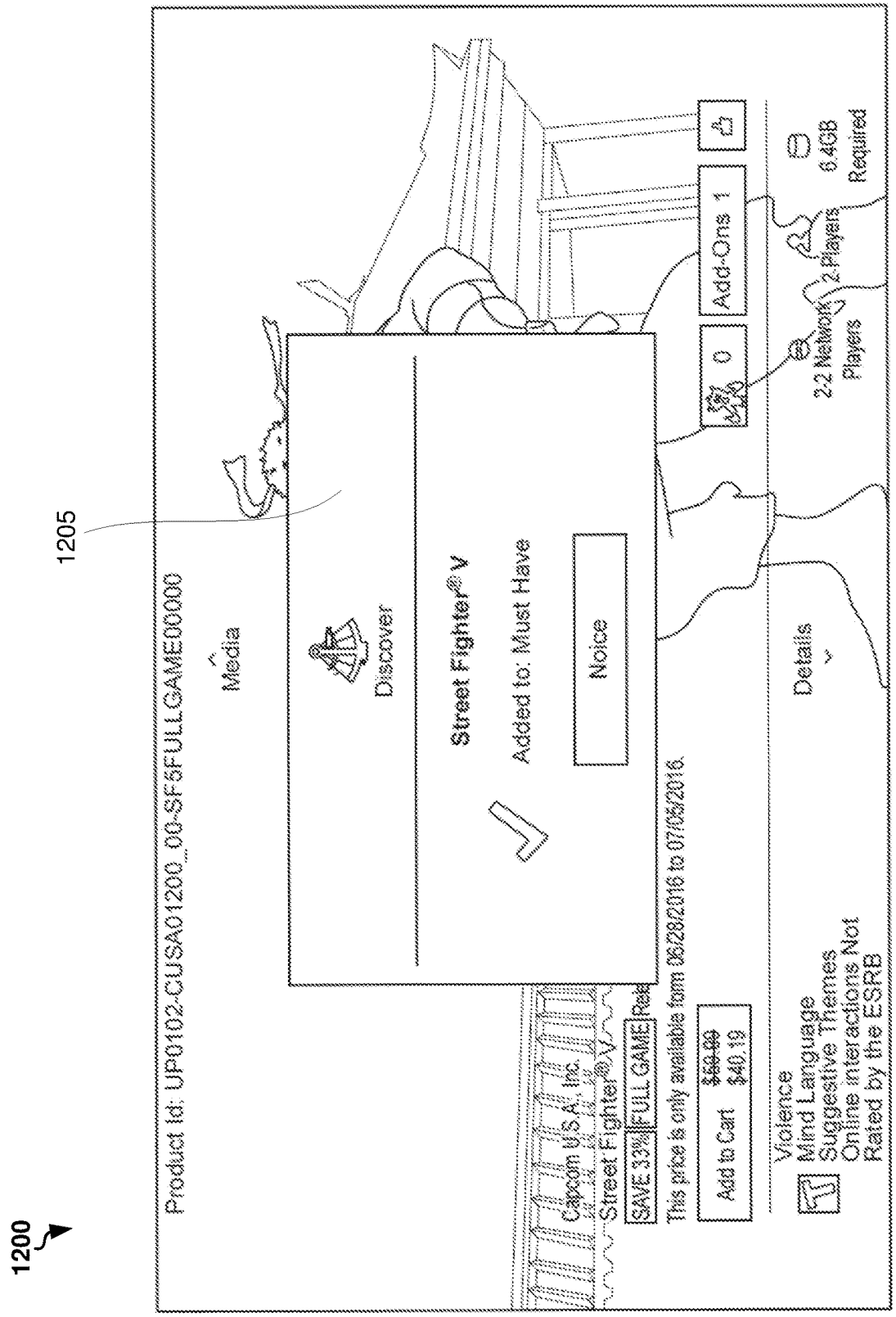
FIG. 12 shows a graphical user interface of the online digital content store displaying a confirmation message for adding a new digital product to a certain wish list.
Figure 13:
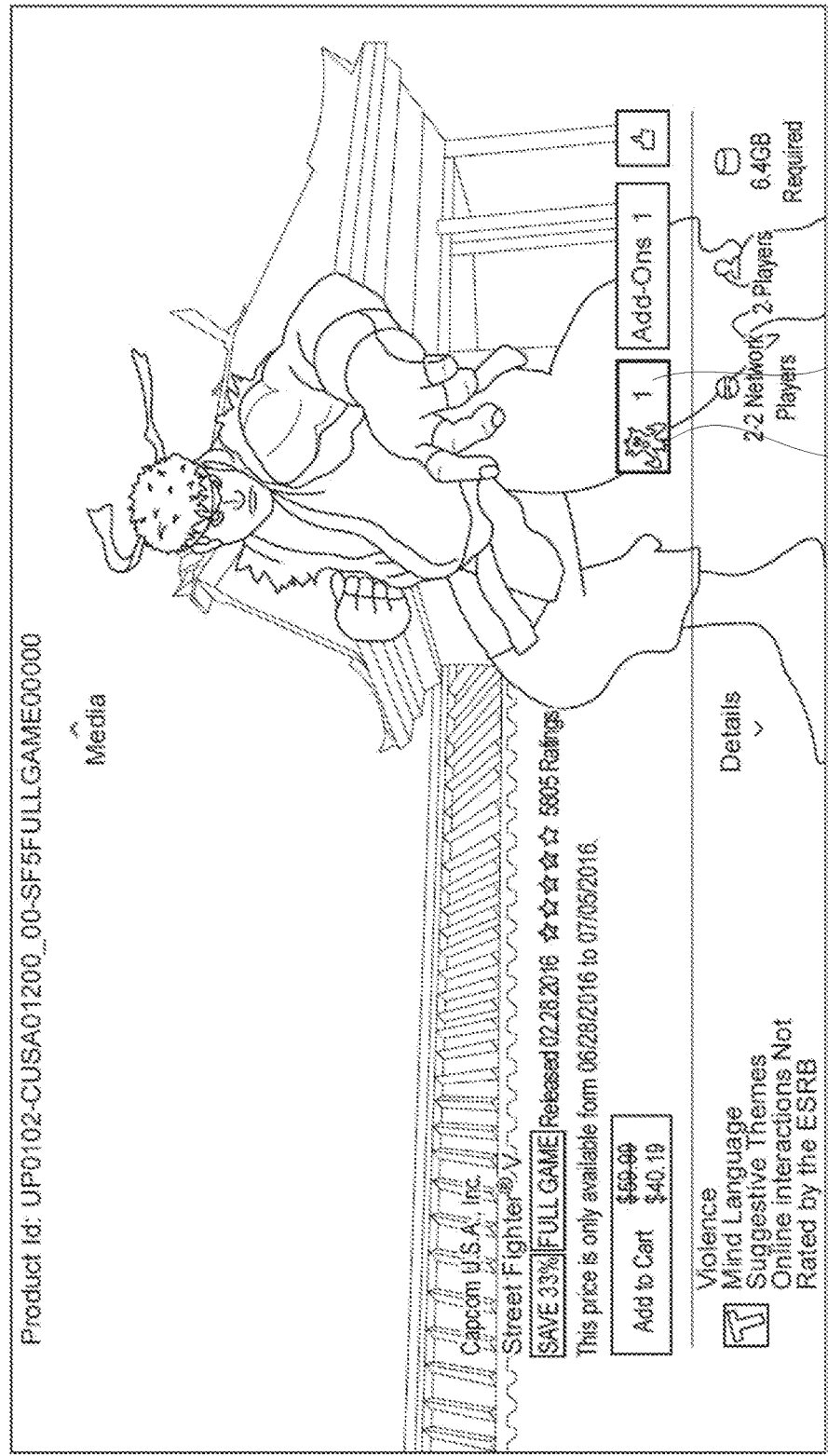
FIG. 13 shows the graphical user interface shown in FIG. 11 after the selected digital product is added to the selected wish list.

After the "Must Have" wish list button 1105 is created, the user is enabled to add digital products of his interest to this wish list. Accordingly, by clicking or otherwise enabling a button associated with the "Must Have" wish list button 1105, the server or online digital content store initiates adding or adds the "Street Fighter" video game to the "Must Have" wish list of the user. The server or online digital content store further displays a graphical user interface 1200 as shown in FIG. 12. Particularly, FIG. 12 shows graphical user interface 1200 of the online digital content store displaying a confirmation message 1205. Message 1205 indicates the successful placement of the selected digital product on the selected wish list. As shown in the figure, message 1205 provides that the "Street Fighter" video game was added to the "Must Have" wish list. Message 1205 can also include a clickable button "Noice" (which may be construed to mean "Ok" or "Submit") to allow the user to confirm the placement of the digital product on the selected wish list. When the user clicks the "Noice" button, the online digital content store switches to a graphical user interface 1300 of FIG. 13. Graphical user interface 1300 substantially replicates graphical user interface 1100 of FIG. 11. However, graphical user interface 1300 does not show wish list menu 320, while icon 325 now displays "1" to indicate that the wish lists of the user now include one digital product.

Figure 14:
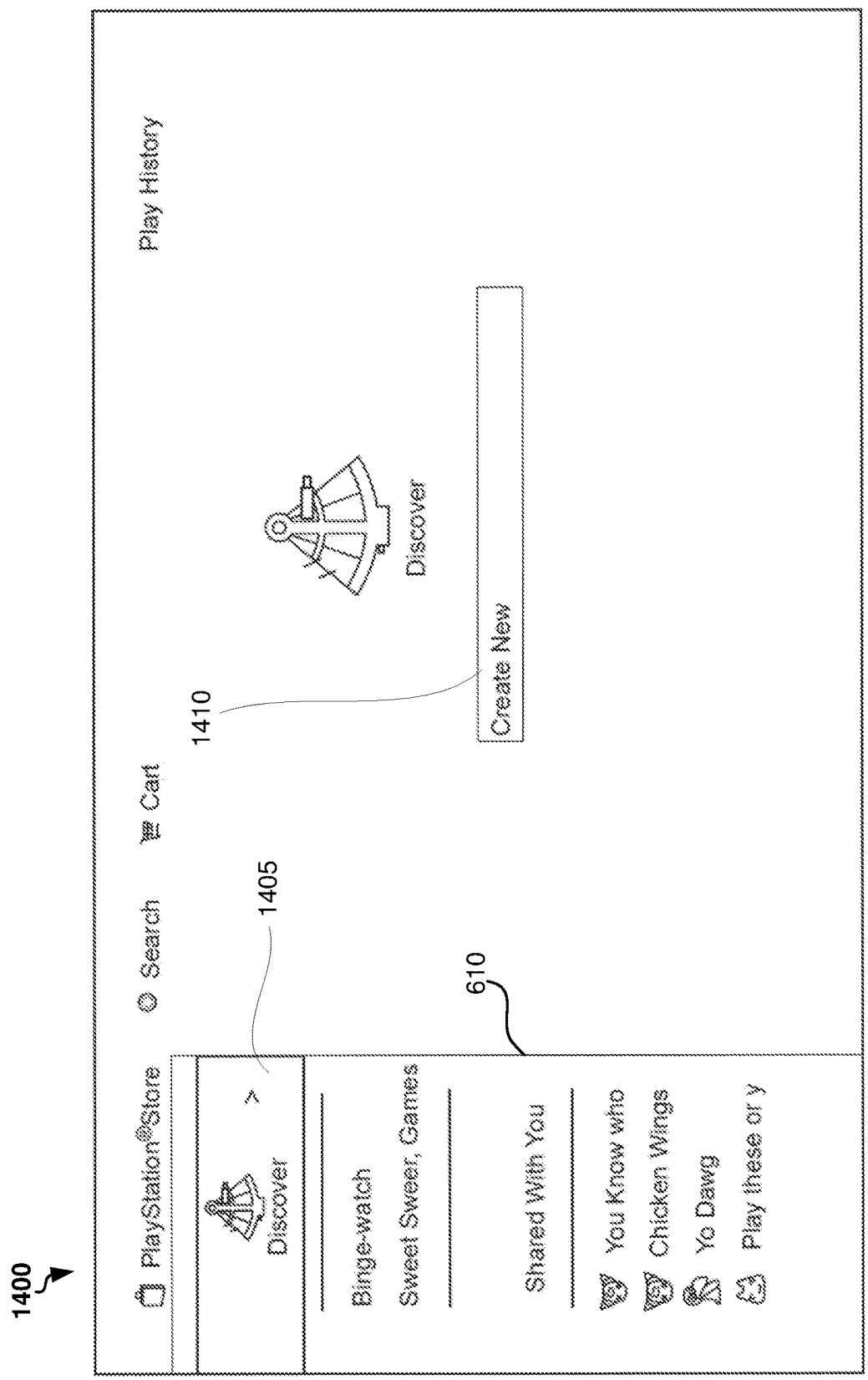
FIG. 14 shows a graphical user interface of the online digital content store allowing a user to interactively learn how to create a new wish list.

In certain embodiments, the user can access interactive help resources of the online digital content store to learn about the "Wish List" feature of the online digital content store. For these ends, as shown in FIG. 14, the user may click a "Discover" button 1405 in menu 610. FIG. 14 shows graphical user interface 1400 of the online digital content store enabling a user to interactively learn how to create a new wish list, according to one embodiment. Graphical user interface 1400 includes an input field 1410 where the user can type in his request such as "create new" or the like. After the user makes the input, the online digital content store can display instructions, such as interactive instructions, showing and enabling the user to create a new wish list. Similarly, the user can learn other features such as sharing wish lists with others.

Figure 15:
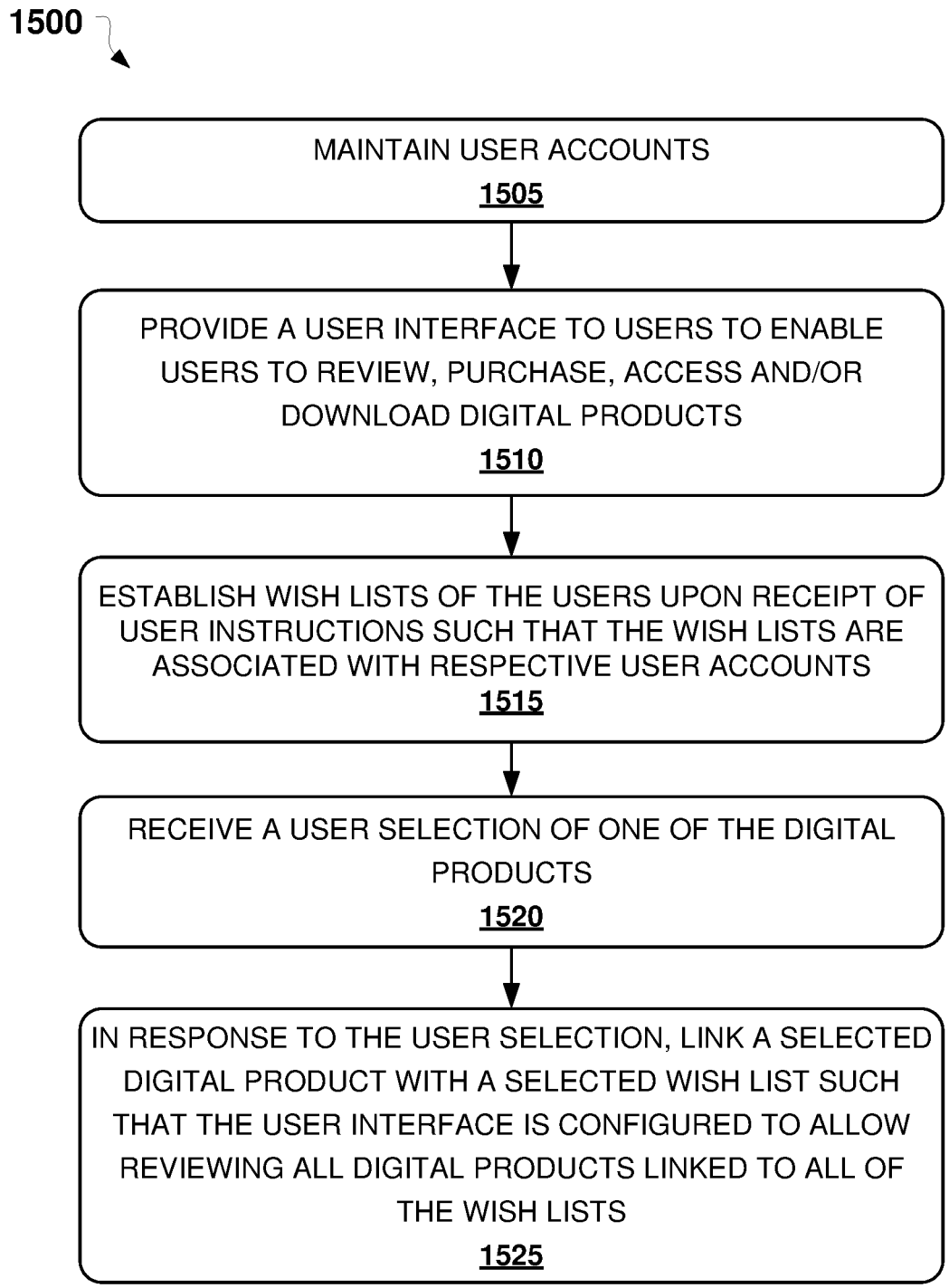
FIG. 15 shows a process flow diagram illustrating a method for custom categorization of digital media content.

FIG. 15 is a process flow diagram showing a method 1500 for custom categorization of digital media content, according to an example embodiment. Method 1500 may be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic refers to server 105 of FIG. 1. Below recited operations of method 1500 may be implemented in an order different than described and shown in the figure. Moreover, method 1500 may have additional operations not shown herein, but which can be evident for those skilled in the art from the present disclosure. Method 1500 may also have fewer operations than outlined below and shown in FIG. 15.

Method 1500 commences at operation 1505 of maintaining, by server 105, one or more user accounts. The user accounts can include, for example, user identifier, certain user settings, user name or nickname, user's contact information, user preferences, user billing information, user login credentials, and so forth. In some embodiments, the user accounts can be maintained in database 120, which may be a relational database. Server 105 can provide functionality of an online digital content store as described above with reference to the plurality of graphical user interfaces.

At operation 1510, server 105 provides a user interface (e.g., graphical user interface or API) for users. The user interface enables the users to review, purchase, and download to user device 110 (or otherwise access) one or more digital products such as video games, videos, television shows, and the like from online digital content store.

At operation 1515, server 105 establishes one or more wish lists of the user upon receipt of one or more user instructions of the user. For example, as shown in graphical user interface 900 of FIG. 9, the user can instruct server 105 to create a new wish list by clicking on "Create New" button 905. When the wish list is created by a certain user, the new wish list is associated with the user account. For these ends, each new wish list can be accompanied by a unique identifier, which can be stored in database 120 with reference to an identifier of the user.

At operation 1520, server 105 receives a user selection of one of the digital products through one of the graphical user interfaces of an online digital content store. For example, the user can click one of icons 205 of graphical user interface 200 of FIG. 2 to cause the online digital content store to display detailed information of selected digital product, and then the user clicks one of the wish lists buttons in wish list menu 320 of graphical user interface 300 of FIG. 3. Thus, the user selection indicates at least two components or attributes: (a) an indication or identifier of the selected digital product; and (a) an indication or identifier of the selected wish list of the user for adding the selected digital product thereto.

At operation 1525, in response to the user selection, server 105 links the selected digital product with the selected wish list such that the graphical user interface of the online digital content store is configured to enable the user to review all digital products linked to all of the wish lists of the user. For example, as shown in FIG. 6, the online digital content store can generate graphical user interface 600 showing a plurality of icons 605 representing a plurality of the digital products that were previously added by the user to a "Netflix & Chill" wish list. The linking of the selected digital product with the selected wish list can cause updating of database 120 (e.g., a relational database) to associate the identifier of selected digital product with the identifier of the selected wish list.

In certain additional embodiments, the user can share information on certain digital products with other users of the online digital content store for their review and consideration. When the users can review the shared information, they can make a decision to purchase certain digital products, add them to their own wish lists, or share them with yet other users. Accordingly, when the user wants to share information on certain digital products, method 1500 may include additional operations of receiving, by server 105, a request from the user to share wish list information related to selected digital products with a second user. In response to this request, server 105 associates the wish list information related to the selected digital products with the user account of the second user and modifies a user interface of the second user to display the selected digital products based on the wish list information of the first user.

In certain additional embodiments, other users of the online digital content store can share information on certain digital products with the user. In these embodiments, method 1500 may include additional operations of receiving, by server 105, a request from a second user to share wish list information related to selected digital products with the user. In response to this request, server 105 modifies the user interface of the first user to display the selected digital products based on the wish list information of the second user. For example, as shown in FIG. 7, graphical user interface 700 includes several icons representing other users such as "You know who" user, "Chicken Wings" user, "Yo Dawg" user, and so forth. When the user clicks on one of these user names, graphical user interface 800 of FIG. 8 can be presented to display icons 805 representing certain digital products that were shared by the user "MyMom."

Figure 16:
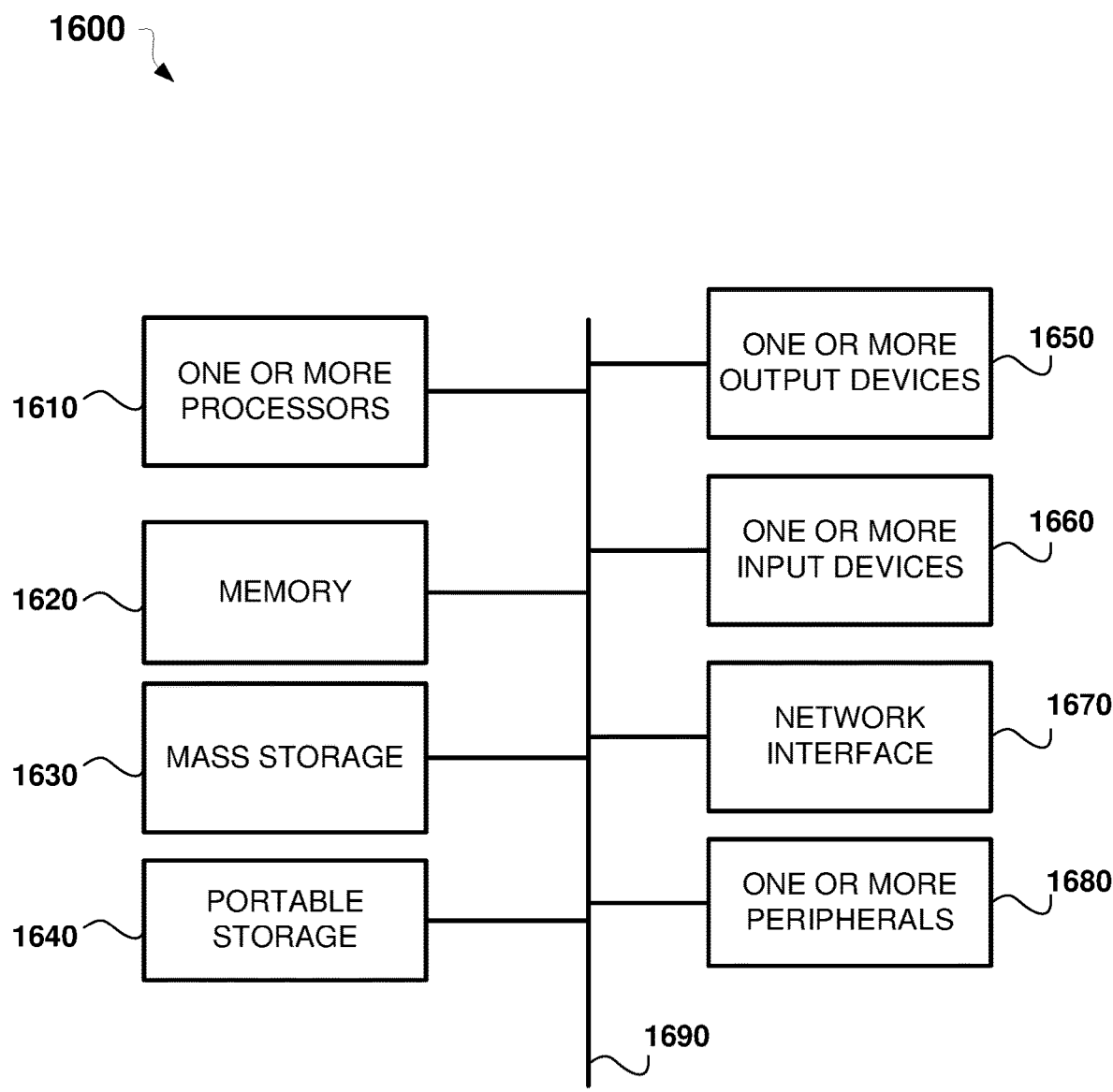
FIG. 16 shows an example computer system that can be used to implement a method for custom categorization of digital media content.

FIG. 16 is a high-level block diagram illustrating a computing device 1600 suitable for implementing the methods described herein. In particular, computing device 1600 may be used for implementing the methods described herein. Computing device 1600 may include, be, or be an integral part of one or more of a variety of types of devices, such as a general-purpose computer, desktop computer, laptop computer, tablet computer, server, netbook, mobile phone, smartphone, infotainment system, smart television device, among others. In some embodiments, computing device 1600 can be regarded as an instance of server 105 or user device 110.

As shown in FIG. 16, computing device 1600 includes one or more processors 1610, memory 1620, one or more mass storage devices 1630, one or more output devices 1650, one or more input devices 1660, network interface 1670, one or more optional peripheral devices 1680, and a communication bus 1690 for operatively interconnecting the above-listed elements. Processors 1610 can be configured to implement functionality and/or process instructions for execution within computing device 1600. For example, processors 1610 may process instructions stored in memory 1620 or instructions stored on storage devices 1630. Such instructions may include components of an operating system or software applications.

Memory 1620, according to one example, is configured to store information within computing device 1600 during operation. For example, memory 1620 can store database 120 or digital media content such as digital products. Memory 1620, in some example embodiments, may refer to a non-transitory computer-readable storage medium or a computer-readable storage device. In some examples, memory 1620 is a temporary memory, meaning that a primary purpose of memory 1620 may not be long-term storage. Memory 1620 may also refer to a volatile memory, meaning that memory 1620 does not maintain stored contents when memory 1620 is not receiving power. Examples of volatile memories include RAM, dynamic random access memories (DRAM), static random access memories (SRAM), and other forms of volatile memories known in the art. In some examples, memory 1620 is used to store program instructions for execution by processors 1610. Memory 1620, in one example, is used by software applications. Generally, software applications refer to software applications suitable for implementing at least some operations of the methods for collecting intent parameters and operating a dialog system as described herein.

Mass storage devices 1630 can also include one or more transitory or non-transitory computer-readable storage media or computer-readable storage devices. For example, memory 1630 can store database 120 or digital media content such as digital products. In some embodiments, mass storage devices 1630 may be configured to store greater amounts of information than memory 1620. Mass storage devices 1630 may be also configured for long-term storage of information. In some examples, mass storage devices 1630 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 16, computing device 1600 may also include one or more input devices 1660. Input devices 1660 may be configured to receive input from a user through tactile, audio, video, or biometric channels. Examples of input devices 1660 may include a keyboard, keypad, mouse, trackball, touchscreen, touchpad, microphone, video camera, image sensor, fingerprint sensor, or any other device capable of detecting an input from a user or other source, and relaying the input to computing device 1600 or components thereof. Output devices 1650 may be configured to provide output to a user through visual or auditory channels. Output devices 1650 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 1650 may also include a touchscreen, presence-sensitive display, or other input/output capable displays known in the art.

Computing device 1600 can also include network interface 1670. Network interface 1670 can be utilized to communicate with external devices via one or more networks such as one or more wired, wireless, or optical networks including, for example, the Internet, intranet, LAN, WAN, cellular phone networks (e.g., Global System for Mobile communications network, Long-Term Evolution communications network, packet switching communications network, circuit switching communications network), Bluetooth radio, and an IEEE 802.11-based radio frequency network, among others. Network interface 1670 may be a network interface card, such as an Ethernet card, an optical transceiver, a radio frequency transceiver, or any other type of device that can send and receive information.

An operating system of computing device 1600 may control one or more functionalities of computing device 1600 or components thereof. For example, the operating system may interact with the software applications and may facilitate one or more interactions between the software applications and processors 1610, memory 1620, storage devices 1630, input devices 1660, output devices 1650, and network interface 1670. The operating system may interact with or be otherwise coupled to software applications or components thereof. In some embodiments, software applications may be included in operating system. Thus, methods and systems for custom categorization of digital media content have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for custom categorization of digital media content, the system comprising:
    a server including at least one processor, a non-transitory computer-readable medium including a computer-executable program code, and a network interface configured to operatively connect the server with a plurality of remote user devices; and
    a relational database hosted by the server, the database storing at least a first user account;
    wherein, the computer-executable program code is configured to cause the at least one processor to:
        provide a first user interface for a first user of the first user account, wherein the first user interface enables the first user to review, purchase, and download to a first user device one or more digital products, the first user interface is configured to enable the first user to review all digital products linked to all wish lists of the first user, the first user interface configured to display at least one digital product of the one or more digital products and including:
            an icon configured to trigger a representation of a wish list menu; and
            an indicator representative of a count of a total number of items in one or more wish lists associated with the first user account;
        establish, within the relational database, one or more wish lists of the first user upon receipt of one or more user instructions of the first user, wherein each of the wish lists of the first user is associated with the first user account and displayed in the wish list menu;
        responsive to receiving a selection of the icon, trigger appearance of the wish list menu on the first user interface, the wish list menu presenting a plurality of selectable options, the selectable options comprising the one or more established wish lists of the first user and a new wish list option;
        receive a first user selection of one of the selectable options via the wish list menu, wherein the computer-executable program code is further configured to cause the at least one processor to:
            in response to the first user selection corresponding to an established wish list of the one or more established wish lists, the first user selection indicating selection of the at least one digital product that corresponds to the first user interface:
                link the corresponding at least one digital product with the selected wish list, the linking including cross-referencing, by the relational database, the selected digital product with the selected established wish list and the first user account; and
                update the indicator to display an updated total count indicative of the total number of items in the one or more established wish lists; and
            in response to the first user selection corresponding to the new wish list option, causing display of a graphical user interface configured for defining a new wish list.

2. The system of claim 1, wherein, when the computer-executable program code is executed by the at least one processor, the at least one processor further:
    receives a request from the first user to share wish list information related to selected digital products with a second user;
    associates the wish list information related to the selected digital products with a second user account; and
    modifies a second user interface of the second user to display the selected digital products based on the wish list information of the first user.

3. The system of claim 1, wherein, when the computer-executable program code is executed by the at least one processor, the at least one processor further:
    receives a request from a second user to share wish list information related to selected digital products with the first user; and
    modifies the first user interface of the first user to display the selected digital products based on the wish list information of the second user.

4. The system of claim 1, wherein each of the wish lists is associated with a unique wish list identifier, each of the digital products is associated with a unique digital product identifier; and wherein the relational database is configured to store, for each user account, the wish list identifiers in association with one or more of the digital product identifiers.

5. The system of claim 1, wherein the first user interface is configured to cause the first user device to display a graphical user interface, the graphical user interface including a menu and a plurality of icons linked to the digital products.

6. The system of claim 5, wherein the graphical user interface is configured to enable the user to open and review the wish lists of the first user, and create new wish lists of the first user, wherein the first user is enabled to name each of the wish lists.

7. The system of claim 1, wherein at least one of the digital products includes one or more of the following: video-on-demand content, pay-per-view content, downloadable video content, downloadable audio content, and a computer game.

8. The system of claim 1, wherein the first user is associated with a plurality of the wish lists of the first user.

9. The system of claim 1, wherein, when the computer-executable program code is executed by the at least one processor, the at least one processor further:

provides the first user interface to the first user and a third user, wherein the first user interface enables the first user and the third user to review, purchase, and download to the first user device one or more of the digital products;

establishes one or more wish lists of the third user upon receipt of one or more user instructions of the third user, wherein each of the wish lists of the third user is associated with the first user account;

receives a third user selection of one of the digital products, wherein the third user selection further indicates a selected wish list of the third user; and in response to the third user selection, links a selected digital product with the selected wish list of the third user, wherein the first user interface is further configured to enable the first user and the third user to review all digital products linked to all of the wish lists of the first user and all of the wish lists of the third user.

10. A computer-implemented method for custom categorization of digital media content, the method comprising:

maintaining, by a server, a first user account in a relational database;

providing, by the server, a first user interface for a first user of the first user account, wherein the first user interface enables the first user to review, purchase, and download to a first user device one or more digital products, the first user interface is configured to enable the first user to review all digital products linked to all wish lists of the first user, the first user interface configured to display at least one digital product of the one or more digital products and including an icon configured to trigger a representation of a wish list menu; and an indicator representative of a count of a total number of items in one or more wish lists associated with the first user account;

establishing, within the relational database, one or more wish lists of the first user upon receipt of one or more user instructions of the first user, wherein each of the wish lists of the first user is associated with the first user account and displayed in the wish list menu;

responsive to receiving a selection of the icon, trigger appearance of the wish list menu on the first user interface, the wish list menu presenting a plurality of selectable options, the selectable options comprising the one or more established wish lists of the first user and a new wish list option;

receiving, by the server, a first user selection of one of the selectable options via the wish list menu, wherein the computer-executable program code is further configured to cause the at least one processor to:

in response to the first user selection corresponding to an established wish list of the one or more established wish lists, the first user selection indicating selection of the at least one digital product that corresponds to the first user interface:

linking, by the server, the corresponding at least one digital product a with the selected wish list, the linking including cross-referencing, by the relational database, the selected digital product with the selected established wish list and the first user account; and update the indicator to display an updated total count indicative of the total number of items in the one or more established wish lists; and in response to the first user selection corresponding to the new wish list option, causing display of a graphical user interface configured for defining a new wish list.

11. The method of claim 10, further comprising:

receiving, by the server, a request from the first user to share wish list information related to selected digital products with a second user;

associating, by the server, the wish list information related to the selected digital products with a second user account; and modifying, by the server, a second user interface of the second user to display the selected digital products based on the wish list information of the first user.

12. The method of claim 10, further comprising:

receiving, by the server, a request from a second user to share wish list information related to selected digital products with the first user; and modifying, by the server, the first user interface of the first user to display the selected digital products based on the wish list information of the second user.

13. The method of claim 10, wherein each of the wish lists is associated with a unique wish list identifier, each of the digital products is associated with a unique digital product identifier; and wherein the relational database is configured to store, for each user account, the wish list identifiers in association with one or more of the digital product identifiers.

14. The method of claim 10, wherein the first user interface is configured to cause the first user device to display a graphical user interface, the graphical user interface including a menu and a plurality of icons linked to the digital products.

15. The method of claim 14, wherein the graphical user interface is configured to enable the user to open and review the wish lists of the first user, and create new wish lists of the first user, wherein the first user is enabled to name each of the wish lists.

16. The method of claim 10, wherein at least one of the digital products includes one or more of the following: video-on-demand content, pay-per-view content, downloadable video content, and downloadable audio content.

17. The method of claim 10, wherein at least one of the digital products includes a computer game.

18. The method of claim 10, wherein the first user is associated with a plurality of the wish lists of the first user.

19. The method of claim 10, further comprising:

providing, by the server, the first user interface to the first user and a third user, wherein the first user interface enables the first user and the third user to review, purchase, and download to the first user device one or more of the digital products;

establishing, by the server, one or more wish lists of the third user upon receipt of one or more user instructions of the third user, wherein each of the wish lists of the third user is associated with the first user account;

receiving, by the server, a third user selection of one of the digital products, wherein the third user selection further indicates a selected wish list of the third user; and in response to the third user selection, linking, by the server, a selected digital product with the selected wish list of the third user, wherein the first user interface is further configured to enable the first user and the third user to review all digital products linked to all of the wish lists of the first user and all of the wish lists of the third user.

20. A non-transitory processor-readable medium having instructions stored thereon, which when executed by one or more processors, cause the one or more processors to implement a method, the method comprising:

maintaining, by a server, a first user account in a relational database;

providing, by the server, a first user interface for a first user of the first user account, wherein the first user interface enables the first user to review, purchase, and download to a first user device one or more digital products, the first user interface is configured to enable the first user to review all digital products linked to all wish lists of the first user, the first user interface configured to display at least one digital product of the one or more digital products and including an icon configured to trigger a representation of a wish list menu; and an indicator representative of a count of a total number of items in one or more wish lists associated with the first user account;

establishing, within the relational database, one or more wish lists of the first user upon receipt of one or more user instructions of the first user, wherein each of the wish lists of the first user is associated with the first user account and displayed in the wish list menu;

responsive to receiving a selection of the icon, trigger appearance of the wish list menu on the first user interface, the wish list menu presenting a plurality of selectable options, the selectable options comprising the one or more established wish lists of the first user and a new wish list option;

receiving, by the server, a first user selection of one of the selectable options via the wish list menu, wherein the computer-executable program code is further configured to cause the at least one processor to:

in response to the first user selection corresponding to an established wish list of the one or more established wish lists, the first user selection indicating selection of the at least one digital product that corresponds to the first user interface:

linking, by the server, the corresponding at least one digital product a, the linking including cross-referencing, by the relational database, the selected digital product with the selected established wish list and the first user account; and update the indicator to display an updated total count indicative of the total number of items in the one or more established wish lists; and in response to the first user selection corresponding to the new wish list option, causing display of a graphical user interface configured for defining a new wish list.

* * * * *

UNITED STATES PATENT AND TRADEMARK OFFICE
CERTIFICATE OF CORRECTION

PATENT NO. : 10,846,779 B2
APPLICATION NO. : 15/360755
DATED : November 24, 2020
INVENTOR(S) : Abinadi Willis Johnson et al.

It is certified that error appears in the above-identified patent and that said Letters Patent is hereby corrected as shown below:

In the Specification

Line 41 Column 2 that portion reading:
-before its added to a selected wish list.-
Should read:
--before it is added to a selected wish list.--

Line 55 Column 2 that portion reading:
-tain digital products;-
Should read:
--tain digital products.--

Line 22 Column 3 that portion reading:
-useful or disclosure in a commercially feasible embodiment-
Should read:
--useful or disclosed in a commercially feasible embodiment--

Line 5 Column 7 that portion reading:
-icons 205.-
Should read:
--widgets or icons 205.--

Line 6 Column 7 that portion reading:
-of icons 205.-
Should read:
--of widgets or icons 205.--

Line 22 Column 7 that portion reading:
-inside the button 310.-

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

Should read:
--inside the clickable or soft button 310.--

Line 14 Column 8 that portion reading:
-same or other digital products of her interest into certain one-
Should read:
--the same or other digital products of her interest into certain one--

Line 30 Column 8 that portion reading:
-the "Netflix & Chill" wish list,-
Should read:
--the "Netflix & Chill" wish list 615,--

Line 42 Column 8 that portion reading:
-content of a "You know who" wish list.-
Should read:
--content of a "You know who" wish list 710.--

Line 45 Column 8 that portion reading:
-"You know who" wish list of certain digital products that-
Should read:
--"You know who" wish list 710 of certain digital products that--

Line 49 Column 8 that portion reading:
-who" wish list shared with the user.-
Should read:
--who" wish list 710 shared with the user.--

Line 50 Column 8 that portion reading:
-icons 705 of his interest to review, purchase, and download-
Should read:
--digital product icons 705 of his interest to review, purchase, and download--

Line 10 Column 9 that portion reading:
-Graphical user interface 900 includes clickable button 310,-
Should read:
--Graphical user interface 900 includes clickable or soft button 310,--

Line 13 Column 9 that portion reading:
-inside the button 310.-
Should read:
--inside the clickable or soft button 310.--

Line 44 Column 10 that portion reading:
-and the like from online digital content store.-

Should read:
--and the like from the online digital content store.--

Line 58 Column 10 that portion reading:
-user can click one of icons 205 of graphical user interface-
Should read:
--user can click one of widgets or icons 205 of graphical user interface--

Line 45 Column 11 that portion reading:
-be presented to display icons 805 representing certain digital-
Should read:
--be presented to display digital product icons 805 representing certain digital--

Line 61 Column 11 that portion reading:
-mass storage devices 1630, one or more output devices-
Should read:
--mass storage devices 1630, one or more portable storage devices 1640, one or more output devices--

Line 2 Column 12 that portion reading:
-1620 or instructions stored on storage devices 1630. Such-
Should read:
--1620 or instructions stored on the one or more mass storage devices 1630. Such--

Line 27 Column 12 that portion reading:
-Mass storage devices 1630 can also include-
Should read:
--One or more mass storage devices 1630 can also include--

Line 30 Column 12 that portion reading:
-memory 1630 can store database-
Should read:
--memory 1620 can store database--

Line 32 Column 12 that portion reading:
-mass storage devices 1630 may be configured to store-
Should read:
--the one or more mass storage devices 1630 may be configured to store--

Line 33 Column 12 that portion reading:
-information than memory 1620. Mass-
Should read:
--information than memory 1620. The one or more mass--

Line 35 Column 12 that portion reading:
-In some examples, mass storage-

Should read:

--In some examples, the one or more mass storage--

Line 14 Column 13 that portion reading:

-memory 1620, storage-

Should read:

--memory 1620, one or more storage--